(12) United States Patent
Yamamoto et al.

(10) Patent No.: US 8,716,418 B2
(45) Date of Patent: May 6, 2014

(54) PROCESS FOR PRODUCING SYNDIOTACTIC α-OLEFIN POLYMER

(75) Inventors: Masayoshi Yamamoto, Tokyo (JP);
Takashi Yukita, Chiba (JP); Masahiro Yamashita, Chiba (JP); Hiromu Kaneyoshi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 1 day.

(21) Appl. No.: 13/517,490

(22) PCT Filed: Dec. 16, 2010

(86) PCT No.: PCT/JP2010/072659
§ 371 (c)(1),
(2), (4) Date: Jun. 20, 2012

(87) PCT Pub. No.: WO2011/078054
PCT Pub. Date: Jun. 30, 2011

(65) Prior Publication Data
US 2012/0283399 A1 Nov. 8, 2012

(30) Foreign Application Priority Data
Dec. 21, 2009 (JP) ................ 2009-289410

(51) Int. Cl.
*C08F 4/6592* (2006.01)
*C08F 4/643* (2006.01)
*C08F 210/02* (2006.01)
*C08F 210/06* (2006.01)
*C08F 210/14* (2006.01)
*C08F 4/642* (2006.01)

(52) U.S. Cl.
CPC .............. *C08F 4/6592* (2013.01); *C08F 4/642* (2013.01); *C08F 4/6428* (2013.01); *C08F 4/643* (2013.01); *C08F 210/02* (2013.01); *C08F 210/06* (2013.01); *C08F 210/14* (2013.01); *Y10S 526/943* (2013.01)
USPC ........... 526/160; 526/133; 526/165; 526/348; 526/943

(58) Field of Classification Search
USPC .......................... 526/133, 160, 165, 348, 943
See application file for complete search history.

(56) References Cited

U.S. PATENT DOCUMENTS

| | | | |
|---|---|---|---|
| 4,960,878 A | 10/1990 | Crapo et al. | |
| 5,041,584 A | 8/1991 | Crapo et al. | |
| 5,157,092 A | 10/1992 | Asanuma et al. | |
| 5,321,106 A | 6/1994 | LaPointe | |
| 5,561,092 A | 10/1996 | Ewen et al. | |
| 5,614,457 A | 3/1997 | Ewen et al. | |
| 5,627,245 A | 5/1997 | Winter et al. | |
| 5,663,249 A | 9/1997 | Ewen et al. | |
| 6,121,395 A | 9/2000 | Turner | |
| 6,160,064 A | 12/2000 | Waymouth et al. | |
| 6,169,151 B1 | 1/2001 | Waymouth et al. | |
| 6,255,425 B1 | 7/2001 | Asanuma et al. | |
| 6,316,558 B1 | 11/2001 | Kaneko et al. | |
| 6,380,341 B1 | 4/2002 | Waymouth et al. | |
| 6,479,685 B2 | 11/2002 | Waymouth et al. | |
| 6,518,378 B2 | 2/2003 | Waymouth et al. | |
| 6,559,089 B1 | 5/2003 | Razavi et al. | |
| 6,559,262 B1 | 5/2003 | Waymouth et al. | |
| 6,960,550 B2 | 11/2005 | Waymouth et al. | |
| 2002/0115805 A1 | 8/2002 | Waymouth et al. | |
| 2005/0228155 A1 | 10/2005 | Kawai et al. | |
| 2008/0220193 A1 | 9/2008 | Tohi et al. | |

FOREIGN PATENT DOCUMENTS

| | | |
|---|---|---|
| EP | 0 426 645 B1 | 7/1996 |
| EP | 1 900 758 A1 | 3/2008 |
| EP | 2 083 023 A1 | 7/2009 |
| JP | 01-501950 A | 7/1989 |
| JP | 01-502036 A | 7/1989 |
| JP | 2-173110 | 7/1990 |
| JP | 03-179005 A | 8/1991 |
| JP | 03-179006 A | 8/1991 |
| JP | 3-200810 | 9/1991 |
| JP | 3-200813 | 9/1991 |
| JP | 03-207703 A | 9/1991 |
| JP | 03-207704 A | 9/1991 |
| JP | 4-502488 A | 7/1992 |

(Continued)

OTHER PUBLICATIONS

V. Busico et al., "Preliminary results of propene hydrooligomerization in the presence of the homogeneous isospecific catalyst system rac-(EBI)ZrCl$_2$/MAO", Die Makromoledulare Chemie Rapid Communications, Feb. 1993, pp. 97-103, vol. 14, No. 2.

T. Tsutsui et al., "Propylene homo- and copolymerization with ethylene using an ethylenebis(1-indenyl)zirconium dichloride and methylaluminozane catalyst system", Polymer, Jul. 1989, pp. 1350-1356, vol. 30.

J. A. Ewen et al., "Syndiospecific Propylene Polymerizations with Group 4 Metallocenes", Journal of the American Chemical Society, 1988, pp. 6255-6256, vol. 110.

(Continued)

*Primary Examiner* — Caixia Lu
(74) *Attorney, Agent, or Firm* — Foley & Lardner LLP

(57) ABSTRACT

A process for producing a syndiotactic α-olefin polymer having high racemic diad fraction and high molecular weight with excellent polymerization activity through a method permitting high-temperature polymerization. The production process comprises polymerizing a monomer that comprises at least one C3-10 α-olefin and a small amount of ethylene, in the presence of an olefin polymerization catalyst comprising a transition metal compound (A) represented by the general formula [1], at least one compound (B) selected from an organoaluminum oxy-compound (b-1), a compound (b-2) that reacts with the transition metal compound (A) to form an ion pair and an organoaluminum compound (b-3), which process for producing a syndiotactic α-olefin polymer satisfies the relationship: $0.001 \leq P_E/P_O \leq 0.030$, provided that the molar amounts of ethylene and an α-olefin having 3 to 10 carbon atoms that are fed into a polymerization reactor under a polymerization temperature of not lower than 25° C. are $P_E$ and $P_O$, respectively.

14 Claims, No Drawings

(56) References Cited

FOREIGN PATENT DOCUMENTS

| JP | 5-209019 A | 8/1993 |
|---|---|---|
| JP | 10-226694 A | 8/1998 |
| JP | 2000-212194 A | 8/2000 |
| JP | 2001-526730 A | 12/2001 |
| JP | 2002-505707 A | 2/2002 |
| JP | 2004-51676 A | 2/2004 |
| JP | 2004-161957 A | 6/2004 |
| JP | 2004-168744 A | 6/2004 |
| JP | 2004-189666 A | 7/2004 |
| JP | 2007-032854 | 11/2007 |
| JP | 2007-302853 A | 11/2007 |
| JP | 2007-302854 A | 11/2007 |
| WO | WO 01/27124 A1 | 4/2001 |
| WO | WO 2006/123759 A1 | 11/2006 |
| WO | WO 2008/059974 A1 | 5/2008 |
| WO | WO 2010/023906 A1 | 3/2010 |

OTHER PUBLICATIONS

C. De Rosa et al., "Crystal Structure of Syndiotactic Polypropylene", Macromolecules, 1993, pp. 5711-5718, vol. 26, No. 21.

M. Kakugo et al., "C NMR Determination of Monomer Sequence Distribution in Ethylene-Propylene Copolymers Prepared with $\delta$-TiCl$_3$-Al(C$_2$H$_5$)$_2$Cl, Macromolecules", 1982, pp. 1150-1152, vol. 15, No. 4.

International Search Report PCT/JP2010/072659 dated Mar. 15, 2011.

PROCESS FOR PRODUCING SYNDIOTACTIC α-OLEFIN POLYMER

TECHNICAL FIELD

The present invention relates to a process for producing a syndiotactic α-olefin polymer using a metallocene catalyst comprising a transition metal compound that has a specific structure.

BACKGROUND ART

As a catalyst for the polymerization of α-olefins having 3 to 10 carbon atoms to industrially produce olefin polymers, Ziegler-Natta catalysts are known. The Ziegler-Natta catalysts are in worldwide use particularly as a catalyst for the polymerization of C3, propylene, to produce polypropylene. The Ziegler-Natta catalysts can produce polypropylene having high molecular weight with high activity, and moreover can control the sequences of propylene to high degree, consequently providing polypropylene having high stereoregularity. Accordingly, isotactic polypropylene having high crystallinity and high melting point is obtained. On the other hand, the Ziegler-Natta catalysts have problems: the presence of plural kinds of active sites in the catalysts by-produces atactic polypropylene, which has irregular propylene sequence, together with the isotactic polypropylene; and in copolymerization of ethylene and an α-olefin having 3 to 10 carbon atoms, the resultant copolymers contain the α-olefin in their polymer chains in a nonuniform proportion, consequently having a wide composition distribution.

Since the discovery in 1980 by W. Kaminsky et al. of metallocene catalysts, the metallocene catalysts, too, have come to be used as a catalyst for the polymerization of α-olefins having 3 to 10 carbon atoms to industrially produce olefin polymers. The metallocene catalysts, most of which are a single metal complex, have a uniform active site, unlike the Ziegler-Natta catalysts. Thus, the metallocene catalysts have an advantage that in the copolymerization of ethylene and an α-olefin having 3 to 10 carbon atoms, they allow the resultant copolymers to contain the α-olefin in a uniform proportion and have a narrow composition distribution and have a high quality. Moreover, by converting a ligand structure of the metal complex, the C3-10 α-olefin sequence can be controlled to high degree. For example, in the polymerization of C3, propylene to produce polypropylene, the metallocene catalysts have characteristics to produce highly isotactic polypropylene as is the case with the Ziegler-Natta catalysts, but do not by-produce atactic polypropylene.

In using the metallocene catalysts for the polymerization of propylene thereby producing isotactic polypropylene, adding hydrogen into the reaction system in order to obtain a desirable molecular weight is known. It has been reported that adding hydrogen improves catalyst activity, and it has been explained that this is because a dormant catalyst species with propylene 2,1-insertion is reactivated by hydrogen (Non-Patent Literature 1). On the other hand, the more hydrogen is added, the lower the molecular weight of the resultant polypropylene becomes. Thus, especially when a high molecular weight is desired, the utility of adding hydrogen and the application scope thereof are restricted.

It has been reported that in using the metallocene catalysts to copolymerize propylene and a small amount of ethylene thereby producing an isotactic polymer (random polypropylene), increasing the amount of ethylene to be added into the reaction system improves the catalyst activity (Non-Patent Literature 2). In this case, the resultant isotactic polypropylene, by including the ethylene unit in the molecular chains, have lowered melting point. For this reason, especially when high heat resistance is desired, the addition amount of ethylene is restricted and moreover other physical properties are affected. In view of this, a method focusing on the use of ethylene in order to achieve higher activity and then using ethylene in a small amount has been proposed (Patent Literature 1): specifically, adding a small amount of ethylene (preferably about 2 wt % or more) to a propylene polymerization reaction system that used a non-bridged metallocene catalyst containing at least one kind of 2-arylindene as a ligand improved catalyst activity. In the example disclosed in this report, using bis(2-(3,5-di-t-butylphenyl)indenyl)zirconium-dichloride to produce a random polypropylene having an ethylene content of 1.9 mol % achieved improved activity and allowed the polymer to have increased molecular weight compared with where ethylene was not added, but resulted in the polymer having a melting point that was lowered from 144° C. to 137° C. Moreover, the resulting random polypropylene had tensile properties such that it showed such elastomeric properties as uniform deformation to high elongation which is followed by high recovery from the elongation. That is, when high heat resistance is desired, the problem remains that the ethylene-addition amount is restricted and moreover other physical properties are affected. On the other hand, there was a report in 1989 about a metallocene catalyst capable of producing a highly syndiotactic polypropylene that was not producible by the Ziegler-Natta catalysts (Non-Patent Literature 3): the highly syndiotactic polypropylene was produced through the polymerization of propylene utilizing a metallocene catalyst obtained by activating a Group IV transition metal compound with aluminoxane, the transition metal compound containing, as a ligand, isopropylidene (cyclopentadienyl)(9-fluorenyl) in which cyclopentadiene and fluorene are bridged by a carbon atom. The syndiotactic structure is under a "racemic" relationship in which substituents bonded to tertiary carbon (methyl groups in the case of propylene) are oriented in a direction alternating between one another, which relationship is in contrast with a "meso" relationship seen in the isotactic structure.

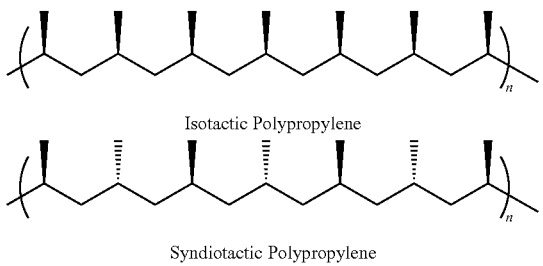

Isotactic Polypropylene

Syndiotactic Polypropylene

A polymer, when keeping an extended relationship of adjacent racemic chains, is highly syndiotactic. The above report defines the degree of the syndiotacticity using a proportion of a part having four consecutive racemic chains in the whole polymer, i.e., racemic pentad fraction. In the report, the highest racemic pentad fraction is 0.86: when this is converted to a simple racemic chain (racemic diad fraction), the racemic diad fraction is 0.96, which is significantly high. Furthermore, a polymer that is highly syndiotactic is crystalline. Since the racemic diad fraction and the racemic pentad fraction are proportional to the melting point (melting temperature) of the polymer, the polymer that has higher syndiotacticity generally shows higher melting point.

The steric influence of such adjacent substituents is as follows. While the isotactic polypropylene adopts a helical secondary structure in which three molecules of propylene are present per turn of the helix to form crystals, it has been reported that the syndiotactic polypropylene, presumably because of the alternating orientation of substituents, can adopt plural energetically-stabilized crystal structures including helical structure and planar zigzag structure depending on heat history and stress history, and that between some of these crystal structures, reversible phase transition is possible (Non-Patent Literature 4). Such difference in crystal structure greatly affects polymer material properties; it has been reported that the syndiotactic polypropylene shows characteristic thermal properties, physical properties and mechanical properties that differ from those of isotactic polypropylene. The difference in material properties caused by the difference between the syndiotactic structure and the isotactic structure is seen also in other α-olefin polymers. Thus, efficient production of polymers having a syndiotactic structure has been demanded.

CITATION LIST

Patent Literature

Patent Literature 1: JP-A-2002-505707

Non-Patent Literatures

Non-Patent Literature 1: Macromol. Chem., Rapid Commun., 1993, 14, 97
Non-Patent Literature 2: Polymer, 1989, 30, 1350
Non-Patent Literature 3: J. Am. Chem. Soc., 1988, 110, 6255
Non-Patent Literature 4: Macromolecules, 1993, 26, 5711

DISCLOSURE OF THE INVENTION

Problems to be Solved by the Invention

The present inventors made their earnest studies and have found out that by performing a production process allowing at least one α-olefin having 3 to 10 carbon atoms and a small amount of ethylene to be present in a specific ratio under a polymerization reaction atmosphere, with the use of an olefin polymerization catalyst comprising a bridged metallocene compound with a specific structure, polymerization activity is improved and the resultant syndiotactic α-olefin polymer has increased molecular weight and high melting point. The present invention has been completed based on this finding.

Means for Solving the Problems

That is, the present invention is directed to a process for producing a syndiotactic α-olefin polymer comprising polymerizing a monomer that comprises at least one α-olefin having 3 to 10 carbon atoms and a small amount of ethylene, in the presence of an olefin polymerization catalyst comprising a transition metal compound (A) represented by the following general formula [1], at least one compound (B) selected from an organoaluminum oxy-compound (b-1), a compound (b-2) that reacts with the transition metal compound (A) to form an ion pair and an organoaluminum compound (b-3),
which process for producing a syndiotactic α-olefin polymer satisfies the relationship: $0.001 \leq P_E/P_O \leq 0.030$, provided that the molar amounts of ethylene and an α-olefin having 3 to 10 carbon atoms that are fed into a polymerization reactor under a polymerization temperature of not lower than 25° C. are $P_E$ and $P_O$, respectively.

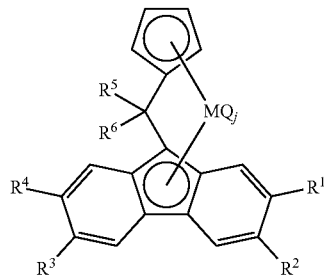

[1]

In the general formula [1], four groups: $R^1$, $R^2$, $R^3$ and $R^4$ are selected from the group consisting of a hydrogen atom, a hydrocarbon group and a silicon-containing group, and may be the same as or different from one another; $R^1$ and $R^2$ are not bonded to each other to form a ring; $R^3$ and $R^4$ are not bonded to each other to form a ring; $R^5$ and $R^6$ are each an atom or a substituent selected from the group consisting of a hydrogen atom, a hydrocarbon group having 2 to 20 carbon atoms and a silicon-containing group, and may be the same as or different from one another; M is selected from a titanium atom, a zirconium atom and a hafnium atom; Q is a halogen atom, a hydrocarbon group, a neutral and conjugated or non-conjugated diene having 10 or less carbon atoms, an anionic ligand or a neutral ligand capable of coordination by lone pair electrons; j is an integer of 1 to 4, and when j is 2 or more, the plurality of Q may be the same as or different from one another.

Effect of the Invention

The olefin polymer production process of the present invention improves polymerization activity and allows the α-olefin polymer to have increased molecular weight as compared with production processes that do not include a small amount of ethylene, and allows the resultant syndiotactic α-olefin polymer to maintain high melting point.

Furthermore, the use of the olefin polymerization catalyst comprising the transition metal compound according to the present invention can produce a syndiotactic α-olefin polymer having high molecular weight in the polymerization at an industrially-possible temperature.

BEST MODE FOR CARRYING OUT THE INVENTION

Hereinafter, preferred embodiments for carrying out the present invention are sequentially described with reference to a transition metal compound (A), an organometallic compound (B), an olefin polymerization catalyst comprising both of these components, and a process for polymerizing olefins in the presence of this olefin polymerization catalyst.

<Transition Metal Compound Component (A)>

The transition metal compound component (A) comprises a transition metal compound represented by the following general formula [1]. The transition metal compound (A) is a bridged metallocene compound. The transition metal compound component (A) can catalyze the polymerization of α-olefins having 3 to 10 carbon atoms with high polymerization activity when the relationship: $0.001 \leq P_E/P_O \leq 0.030$ is satisfied provided that the molar amounts of ethylene and an α-olefin having 3 to 10 carbon atoms that are fed into a polymerization reactor are $P_E$ and $P_O$, respectively. The α-olefin polymer obtained has highly syndiotactic α-olefin chains, and has high molecular weight and high melting point that are well balanced.

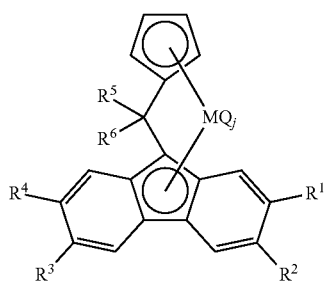

[1]

In the formula [1], four groups: $R^1$, $R^2$, $R^3$ and $R^4$ are selected from the group consisting of a hydrogen atom, a hydrocarbon group and a silicon-containing group, and may be the same as or different from one another; $R^1$ and $R^2$ are not bonded to each other to form a ring; and $R^3$ and $R^4$ are not bonded to each other to form a ring. It is more preferable that $R^1$ and $R^4$ are the same atom or the same group, and $R^2$ and $R^3$ are the same atom or the same group; and it is particularly preferable that $R^2$ and $R^3$ are t-butyl groups.

In the formula [1], $R^5$ and $R^6$ are each an atom or a substituent selected from the group consisting of a hydrogen atom, a hydrocarbon group having 2 to 20 carbon atoms and a silicon-containing group, and may be the same as or different from one another. It is more preferable that $R^5$ and $R^6$ are hydrocarbon groups having 6 to 20 carbon atoms.

Examples of the hydrocarbon group having 6 to 20 carbon atoms include:

aryl groups such as phenyl group and naphthyl group;

alkylaryl groups such as o-tolyl group, m-tolyl group, p-tolyl group, ethylphenyl group, n-propylphenyl group, i-propylphenyl group, n-butylphenyl group, s-butylphenyl group, t-butylphenyl group and xylyl group;

chloroaryl groups such as o-chlorophenyl group, m-chlorophenyl group, p-chlorophenyl group and chloronaphthyl group;

bromoaryl groups such as o-bromophenyl group, m-bromophenyl group, p-bromophenyl group and bromonaphthyl group;

bromoalkylaryl groups such as bromomethylphenyl group and dibromomethylphenyl group;

iodoaryl groups such as o-iodophenyl group, m-iodophenyl group, p-iodophenyl group and iodonaphthyl group;

iodoalkylaryl groups such as iodomethylphenyl group and diiodomethylphenyl group;

aralkyl groups such as benzyl group, α-phenethyl group, β-phenethyl group, diphenylmethyl group, naphthylmethyl group and neophyl group; and halogenated benzyl groups such as m-chlorobenzyl group, p-chlorobenzyl group, m-bromobenzyl group, p-bromobenzyl group, m-iodobenzyl group and p-iodobenzyl group.

$R^1$ and $R^4$ are each preferably a hydrogen atom or a hydrocarbon group having 6 to 20 carbon atoms; more preferably a hydrogen atom or an aryl group having 6 to 10 carbon atoms; particularly preferably a hydrogen atom, phenyl group, o-tolyl group, m-tolyl group, p-tolyl group, o-chlorophenyl group, m-chlorophenyl group or p-chlorophenyl group.

$R^5$ and $R^6$ may be the same as or different from one another, and are each preferably an aryl group having 6 to 10 carbon atoms or an aralkyl group having 6 to 10 carbon atoms; particularly preferably, phenyl group, benzyl group, m-chlorophenyl group, p-chlorophenyl group, m-chlorobenzyl group or p-chlorobenzyl group.

M is titanium, zirconium or hafnium, preferably zirconium or hafnium, particularly preferably zirconium.

Q is an atom or a group selected from a halogen atom, a hydrocarbon group, an anionic ligand or a neutral ligand capable of coordination by lone pair electrons. Qs may be the same as or different from one another.

Specific examples of the halogen atom include fluorine, chlorine, bromine and iodine. Specific examples of the hydrocarbon group include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexylmethyl, cyclohexyl, 1-methyl-1-cyclohexyl, s-cis- or s-trans-$\eta^4$-1,3-butadiene, s-cis- or s-trans-$\eta^4$-1,4-diphenyl-1,3-butadiene, s-cis- or s-trans-$\eta^4$-3-methyl-1,3-pentadiene, s-cis- or s-trans-$\eta^4$-1,4-dibenzyl-1,3-butadiene, s-cis- or s-trans-$\eta^4$-2,4-hexadiene, s-cis- or s-trans-$\eta^4$-1,3-pentadiene, s-cis- or s-trans-$\eta^4$-1,4-ditolyl-1,3-butadiene and s-cis- or s-trans-$\eta^4$-1,4-bis(trimethylsilyl)-1,3-butadiene.

Specific examples of the anionic ligand include alkoxy groups such as methoxy, tert-butoxy and phenoxy; carboxylate groups such as acetate and benzoate; and sulfonate groups such as mesylate and tosylate. Specific examples of the neutral ligand capable of coordination by lone pair electrons include organophosphorus compounds such as trimethylphosphine, triethylphosphine, triphenylphosphine and diphenylmethylphosphine; and ethers such as tetrahydrofuran, diethylether, dioxane and 1,2-dimethoxyethane.

A preferred embodiment of Q is a halogen atom or an alkyl group having 1 to 5 carbon atoms.

j is an integer of 1 to 4, preferably 2.

Transition Metal Compound (A) and Examples Thereof

Hereinafter, specific examples of the transition metal compound (A) represented by the general formula [1] in the present invention are described, without limiting the scope of the present invention.

Specific examples of the transition metal compound (A) represented by the general formula [1] in the present invention include: dibenzylmethylene(cyclopentadienyl)(2,7-dimethyl-3,6-di-ter t-butylfluorenyl)zirconiumdichloride [also referred to as 1,3-diphenylisopropylidene (cyclopentadienyl)(2,7-dimethyl-3,6-di-tert-butylfluorenyl) zirconiumdichloride; hereinafter, alias of each compound is omitted], dibenzylmethylene(cyclopentadienyl(2,7-di(2,4,6-trimethylphenyl)-3,6-di-tert-butylfluorenyl) zirconiumdichloride, dibenzylmethylene(cyclopentadienyl) (2,7-diphenyl-3,6-di-ter t-butylfluorenyl) zirconiumdichloride, dibenzylmethylene(cyclopentadienyl) (2,7-di(3,5-dimethylphen yl)-3,6-di-tert-butylfluorenyl) zirconiumdichloride, dibenzylmethylene(cyclopentadienyl) (2,7-di(4-methylphenyl)-3,6-di-tert-butylfluorenyl) zirconiumdichloride, dibenzylmethylene(cyclopentadienyl) (2,7-dinaphthyl-3,6-di-t ert-butylfluorenyl) zirconiumdichloride, dibenzylmethylene(cyclopentadienyl) (2,7-di(4-tert-butylphenyl)-3,6-di-tert-butylfluorenyl) zirconiumdichloride, diphenethylmethylene (cyclopentadienyl)(2,7-diphenyl-3,6-di-tert-butylfluorenyl) zirconiumdichloride, di(benzhydryl)methylene (cyclopentadienyl)(2,7-diphenyl-3,6-di-tert-butylfluorenyl) zirconiumdichloride, di(cumyl)methylene (cyclopentadienyl)(2,7-diphenyl-3,6-di-tert-butylfluorenyl) zirconiumdichloride, diphenylmethylene(cyclopentadienyl) (3,6-di-tert-butylfluorenyl)zirconiumdichloride, di-o-tolylmethylene(cyclopentadienyl)(3,6-di-tert-butylfluorenyl)zirconiumdichloride, di-m-tolylmethylene (cyclopentadienyl)(3,6-di-tert-butylfluorenyl) zirconiumdichloride, di-p-tolylmethylene(cyclopentadienyl) (3,6-di-tert-butylfluorenyl)zirconiumdichloride, di(o-chlorophenyl)methylene(cyclopentadienyl)(3,6-di-tert-butylfluorenyl)zirconiumdichloride, di(m-chlorophenyl) methylene(cyclopentadienyl)(3,6-di-tert-butylfluorenyl) zirconiumdichloride, di(p-chlorophenyl)methylene (cyclopentadienyl)(3,6-di-tert-butylfluorenyl) zirconiumdichloride, di(o-bromophenyl)methylene (cyclopentadienyl)(3,6-di-tert-butylfluorenyl) zirconiumdichloride, di(m-bromophenyl)methylene (cyclopentadienyl)(3,6-di-tert-butylfluorenyl) zirconiumdichloride, di(p-bromophenyl)methylene (cyclopentadienyl)(3,6-di-tert-butylfluorenyl) zirconiumdichloride, di(o-iodophenyl)methylene (cyclopentadienyl)(3,6-di-tert-butylfluorenyl) zirconiumdichloride, di(m-iodophenyl)methylene (cyclopentadienyl)(3,6-di-tert-butylfluorenyl) zirconiumdichloride, di(p-iodophenyl)methylene (cyclopentadienyl)(3,6-di-tert-butylfluorenyl) zirconiumdichloride, di(o-trifluoromethylphenyl)methylene (cyclopentadienyl)(3,6-di-tert-butylfluorenyl) zirconiumdichloride, di(m-trifluoromethylphenyl) methylene(cyclopentadienyl)(3,6-di-tert-butylfluorenyl) zirconiumdichloride, di(p-trifluoromethylphenyl)methylene (cyclopentadienyl)(3,6-di-tert-butylfluorenyl) zirconiumdichloride, di(2-naphthyl)methylene (cyclopentadienyl)(3,6-di-tert-butyl fluorenyl) zirconiumdichloride, dibenzylmethylene(cyclopentadienyl) (3,6-di-tert-butylfluorenyl)zirconiumdichloride, di(o-chlorobenzyl)methylene(cyclopentadienyl)(3,6-di-tert-butylfluorenyl)zirconiumdichloride, di(m-chlorobenzyl) methylene(cyclopentadienyl)(3,6-di-tert-butylfluorenyl) zirconiumdichloride, di(p-chlorobenzyl)methylene (cyclopentadienyl)(3,6-di-tert-butylfluorenyl) zirconiumdichloride, di(o-bromobenzyl)methylene (cyclopentadienyl)(3,6-di-tert-butylfluorenyl) zirconiumdichloride, di(m-bromobenzyl)methylene (cyclopentadienyl)(3,6-di-tert-butylfluorenyl) zirconiumdichloride, di(p-bromobenzyl)methylene (cyclopentadienyl)(3,6-di-tert-butylfluorenyl) zirconiumdichloride, di(o-iodobenzyl)methylene (cyclopentadienyl)(3,6-di-tert-butylfluorenyl) zirconiumdichloride, di(m-iodobenzyl)methylene (cyclopentadienyl)(3,6-di-tert-butylfluorenyl) zirconiumdichloride, di(p-iodobenzyl)methylene (cyclopentadienyl)(3,6-di-tert-butylfluorenyl) zirconiumdichloride, di(o-methylbenzyl)methylene (cyclopentadienyl)(3,6-di-tert-butylfluorenyl) zirconiumdichloride, di(m-methylbenzyl)methylene (cyclopentadienyl)(3,6-di-tert-butylfluorenyl) zirconiumdichloride, di(p-methylbenzyl)methylene (cyclopentadienyl)(3,6-di-tert-butylfluorenyl) zirconiumdichloride, (benzyl)(phenyl)methylene (cyclopentadienyl)(3,6-di-tert-butylfluorenyl) zirconiumdichloride, (benzyl)(phenyl)methylene (cyclopentadienyl)(2,7-diphenyl-3,6-di-tert-butylfluorenyl) zirconiumdichloride, (benzyl)(phenyl)methylene (cyclopentadienyl)(2,7-di-o-tolyl-3,6-di-tert-butylfluorenyl) zirconiumdichloride, (benzyl)(phenyl)methylene (cyclopentadienyl)(2,7-di-p-chlorophenyl-3,6-di-tert-butylfluorenyl)zirconiumdichloride, (p-chlorobenzyl) (phenyl)methylene(cyclopentadienyl)(2,7-diphenyl-3,6-di-tert-butylfluorenyl)zirconiumdichloride, (p-chlorobenzyl) (phenyl)methylene(cyclopentadienyl)(2,7-di-o-tolyl-3,6-di-tert-butylfluorenyl)zirconiumdichloride, (p-chlorobenzyl) (phenyl)methylene(cyclopentadienyl)(2,7-di-p-chlorophenyl-3,6-di-tert-butylfluorenyl) zirconiumdichloride, (benzyl)(p-chlorophenyl)methylene (cyclopentadienyl)(2,7-diphenyl-3,6-di-tert-butylfluorenyl) zirconiumdichloride, (benzyl)(p-chlorophenyl)methylene (cyclopentadienyl)(2,7-di-o-tolyl-3,6-di-tert-butylfluorenyl) zirconiumdichloride, (benzyl)(p-chlorophenyl)methylene (cyclopentadienyl)(2,7-di-p-chlorophenyl-3,6-di-tert-butylfluorenyl)zirconiumdichloride, diphenylmethylene (cyclopentadienyl)(2,7-di-o-tolyl-3,6-di-tert-butylfluorenyl) zirconiumdichloride, di-p-tolyl-methylene (cyclopentadienyl)(2,7-di-o-tolyl-3,6-di-tert-butylfluorenyl) zirconiumdichloride, di(p-chlorophenyl)methylene (cyclopentadienyl)(2,7-di-o-tolyl-3,6-di-tert-butylfluorenyl) zirconiumdichloride, di(p-trifluoromethylphenyl)methylene (cyclopentadienyl)(2,7-di-o-tolyl-3,6-di-tert-butylfluorenyl) zirconiumdichloride, di(2-naphthyl)methylene (cyclopentadienyl)(2,7-di-o-tolyl-3,6-di-tert-butylfluorenyl) zirconiumdichloride, dibenzylmethylene(cyclopentadienyl) (2,7-di-o-tolyl-3,6-di-tert-butylfluorenyl) zirconiumdichloride, di(p-chlorobenzyl)methylene (cyclopentadienyl)(2,7-di-o-tolyl-3,6-di-tert-butylfluorenyl) zirconiumdichloride, di(p-methylbenzyl)methylene (cyclopentadienyl)(2,7-di-o-tolyl-3,6-di-tert-butylfluorenyl) zirconiumdichloride, dibenzylmethylene(cyclopentadienyl) (2,7-di-o-tolyl-fluorenyl)zirconiumdichloride, dibenzylmethylene(cyclopentadienyl)[2,7-di-(o-ethylphenyl)-3,6-di-tert-butylfluorenyl]zirconiumdichloride, dibenzylmethylene(cyclopentadienyl)[2,7-di-[o-(n-propyl)phenyl]-3,6-di-tert-butylfluorenyl]zirconiumdichloride, dibenzylmethylene(cyclopentadienyl)[2,7-di-[o-(iso-propyl)phenyl]-3,6-di-tert-butylfluorenyl]zirconiumdichloride, dibenzylmethylene(cyclopentadienyl)[2,7-di-[o-(n-butyl) phenyl]-3,6-di-tert-butylfluorenyl]zirconiumdichloride, dibenzylmethylene(cyclopentadienyl)[2,7-di-[o-(iso-butyl) phenyl]-3,6-di-tert-butylfluorenyl]zirconiumdichloride, dibenzylmethylene(cyclopentadienyl)[2,7-di-[o-(sec-butyl) phenyl]-3,6-di-tert-butylfluorenyl]zirconiumdichloride, dibenzylmethylene(cyclopentadienyl)[2,7-di-[o-(tert-butyl) phenyl]-3,6-di-tert-butylfluorenyl]zirconiumdichloride, dibenzylmethylene(cyclopentadienyl)[2,7-di-[o-(n-icosyl) phenyl]-3,6-di-tert-butylfluorenyl]zirconiumdichloride, dibenzylmethylene(cyclopentadienyl)[2,7-di-(o-cyclohexylphenyl)-3,6-di-tert-butylfluorenyl]zirconiumdichloride, dibenzylmethylene(cyclopentadienyl)[2,7-di-(biphenyl-2-yl)-3,6-di-tert-butylfluorenyl]zirconiumdichloride, dibenzylmethylene(cyclopentadienyl)[2,7-di-[o-(2-naphthyl)phenyl]-3,6-di-tert-butylfluorenyl]zirconiumdichloride, dibenzylmethylene(cyclopentadienyl) [2,7-di-[o-(2-phenanthryl)phenyl]-3,6-di-tert-butylfluorenyl]zirconiumdichloride, dibenzylmethylene(cyclopentadienyl)[2,7-di-(o-trimethylsilyl-phenyl)-3,6-di-tert-butylfluorenyl] zirconiumdichloride, dibenzylmethylene(cyclopentadienyl) [2,7-di-(o-triphenylsilyl-phenyl)-3,6-di-tert-butylfluorenyl] zirconiumdichloride, diphenylmethylene(cyclopentadienyl) (2,7-diphenyl-3,6-di-tert-butylfluorenyl) zirconiumdichloride, dibenzylmethylene(cyclopentadienyl) (2,7-di-p-chlorophenyl-3,6-di-tert-butylfluorenyl) zirconiumdichloride, diphenylmethylene(cyclopentadienyl) (2,7-di-p-chlorophenyl-3,6-di-tert-butylfluorenyl) zirconiumdichloride, di-p-tolyl-methylene (cyclopentadienyl)(2,7-di-p-chlorophenyl-3,6-di-tert-butylfluorenyl)zirconiumdichloride, di(p-chlorophenyl)

methylene(cyclopentadienyl)(2,7-di-p-chlorophenyl-3,6-di-tert-butylfluorenyl)zirconiumdichloride, di(p-trifluoromethylphenyl)methylene(cyclopentadienyl)(2,7-di-p-chlorophenyl-3,6-di-tert-butylfluorenyl)zirconiumdichloride, di(2-naphthyl)methylene (cyclopentadienyl)(2,7-di-p-chlorophenyl-3,6-di-tert-butylfluorenyl)zirconiumdichloride, dibenzylmethylene (cyclopentadienyl)(2,7-di-p-chlorophenyl-3,6-di-tert-butylfluorenyl)zirconiumdichloride, di(p-chlorobenzyl) methylene(cyclopentadienyl)(2,7-di-p-chlorophenyl-3,6-di-tert-butylfluorenyl)zirconiumdichloride, di(p-methylbenzyl) methylene(cyclopentadienyl)(2,7-di-p-chlorophenyl-3,6-di-tert-butylfluorenyl)zirconiumdichloride, dibenzylmethylene (cyclopentadienyl)(2,7-di-p-chlorophenyl-3,6-ditrimethylsilylfluorenyl)zirconiumdichloride, dibenzylmethylene(cyclopentadienyl)(2,7-di-p-chlorophenyl-3,6-dicumylfluorenyl)zirconiumdichloride, dibenzylmethylene(cyclopentadienyl)(2,7-di-p-chlorophenyl-3,6-adamantylfluorenyl)zirconiumdichloride, dimethylmethylene (cyclopentadienyl)(2,7-di-p-trifluoromethyl-phenyl-3,6-di-tert-butylfluorenyl)zirconiumdichloride, diethylmethylene (cyclopentadienyl)(2,7-di-p-trifluoromethyl phenyl-3,6-di-tert-butylfluorenyl)zirconiumdichloride, di-n-propylmethylene(cyclopentadienyl)(2,7-di-p-trifluoromethylphenyl-3,6-di-tert-butylfluorenyl) zirconiumdichloride, di-iso-propylmethylene (cyclopentadienyl)(2,7-di-p-trifluoromethylphenyl-3,6-di-tert-butylfluorenyl)zirconiumdichloride, di-n-butylmethylene(cyclopentadienyl)(2,7-di-p-trifluoromethylphenyl-3,6-di-tert-butylfluorenyl) zirconiumdichloride, di-iso-butylmethylene (cyclopentadienyl)(2,7-di-p-trifluoromethylphenyl-3,6-di-tert-butylfluorenyl)zirconiumdichloride, di-sec-butylmethylene(cyclopentadienyl)(2,7-di-p-trifluoromethylphenyl-3,6-di-tert-butylfluorenyl) zirconiumdichloride, di-tert-butylmethylene (cyclopentadienyl)(2,7-di-p-trifluoromethylphenyl-3,6-di-tert-butylfluorenyl)zirconiumdichloride, di-n-octylmethylene(cyclopentadienyl)(2,7-di-p-trifluoromethylphenyl-3,6-di-tert-butylfluorenyl) zirconiumdichloride, di-n-triacontylmethylene (cyclopentadienyl)(2,7-di-p-trifluoromethylphenyl-3,6-di-tert-butylfluorenyl)zirconiumdichloride, phenylmethylene (cyclopentadienyl)(2,7-di-p-trifluoromethylphenyl-3,6-di-tert-butylfluorenyl)zirconiumdichloride, diphenylmethylene (cyclopentadienyl)(2,7-di-p-trifluoromethyl-phenyl-3,6-di-tert-butylfluorenyl)zirconiumdichloride, di-p-tolylmethylene(cyclopentadienyl)(2,7-di-p-trifluoromethylphenyl-3,6-di-tert-butylfluorenyl) zirconiumdichloride, di(p-chlorophenyl)methylene (cyclopentadienyl)(2,7-di-p-trifluoromethylphenyl-3,6-di-tert-butylfluorenyl)zirconiumdichloride, di(p-trifluoromethylphenyl)methylene(cyclopentadienyl)(2,7-di-p-trifluoromethylphenyl-3,6-di-tert-butylfluorenyl) zirconiumdichloride, di(2-naphthyl)methylene (cyclopentadienyl)(2,7-di-p-trifluoromethylphenyl-3,6-di-tert-butylfluorenyl)zirconiumdichloride, dibenzylmethylene (cyclopentadienyl)(2,7-di-p-trifluoromethyl-phenyl-3,6-di-tert-butylfluorenyl)zirconiumdichloride, di(p-chlorobenzyl) methylene(cyclopentadienyl)(2,7-di-p-trifluoromethylphenyl-3,6-di-tert-butylfluorenyl) zirconiumdichloride, di(p-methylbenzyl)methylene (cyclopentadienyl)(2,7-di-p-trifluoromethylphenyl-3,6-di-tert-butylfluorenyl)zirconiumdichloride; compounds in which a zirconium atom of the above compounds is replaced with a hafnium atom or a titanium atom; compounds in which a chlorine atom of the above compounds is replaced with methyl group or benzyl group; and combinations thereof, without being limited thereto. Among a hafnium atom, a zirconium atom and a titanium atom, preferable is a zirconium atom. These compounds may be used singly, or two or more kinds may be used in combination.

Production Process of Transition Metal Compound (A)

The transition metal compound (A) used in the present invention can be produced by known methods without limitation. Exemplary methods are described in JP-A-2000-212194, JP-A-2004-168744, JP-A-2004-189666, JP-A-2004-161957, JP-A-2007-302854, JP-A-2007-302853, WO01/027124, JP-A-2001-526730 and JP-A-H10-226694.

Preferred Embodiments when Transition Metal Compound (A) is Subjected to Olefin Polymer Production There are described hereinbelow preferred embodiments when the transition metal compound (A) employed in the present invention is used as a catalyst for the production of olefin polymers (olefin polymerization catalyst).

<Olefin Polymerization Catalyst>

When the transition metal compound (A) is used as the olefin polymerization catalyst, the catalyst comprises the transition metal compound (A) and an organometallic compound (B). Here, the organometallic compound (B) is at least one organometallic compound (B) selected from the following compounds (b-1), (b-2) and (b-3).

(b-1) Organoaluminum Oxy-Compound
(b-2) Compound that Reacts with the Transition Metal Compound (A) to Form an Ion Pair
(b-3) Organoaluminum Compound The compounds (b-1), (b-2) and (b-3) each may be used singly, or two or more kinds may be used in combination. The olefin polymerization catalyst may further comprise a particulate carrier (C) and an organic compound component (D) as required. Hereinafter, the individual components are specifically described.

[Organoaluminum Oxy-Compound (b-1)]

As the organoaluminum oxy-compound (b-1) used in the present invention, hitherto publicly known aluminoxane may be used as it is. Specifically, exemplary compounds are those represented by the following general formula [2]:

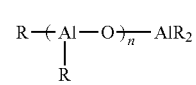

and/or the following general formula [3]:

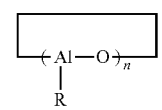

In the general formulae [2] and [3], R is a hydrocarbon group having 1 to 10 carbon atoms; and n is an integer of 2 or more. Compounds represented by the formulae in which R is methyl group and n is 3 or more, preferably 10 or more are used suitably as methylaluminoxane (MAO). Mixing of organoaluminum compounds into these aluminoxanes is permitted.

As the organoaluminum oxy-compound (b-1) used in the present invention, further examples include such modified methylaluminoxane as represented by the following general formula [4].

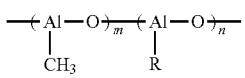

In the formula, R is a hydrocarbon group having 2 to 10 carbon atoms; and m and n are each an integer of 2 or more. The modified methylaluminoxane is prepared using trimethylaluminum and an alkylaluminum other than trimethylaluminum. Such a compound as represented by the formula [4] is generally referred to as MMAO. The MMAO can be prepared by the process described in U.S. Pat. No. 4,960,878 and U.S. Pat. No. 5,041,584. Further, compounds prepared by using trimethylaluminum and tri-isobutyl aluminum which is represented by the above formula wherein R is isobutyl group are commercially available under the name of MMAO or TMAO from Tosoh Finechem Corporation and the like. The MMAO is an aluminoxane which has improved storage stability and improved solubility in various kinds of solvents; specifically, it dissolves in an aliphatic or alicyclic hydrocarbon, unlike the MAO of the formula [2] or [3].

Further examples of the organoaluminum oxy-compound (b-1) used in the present invention include boron-containing organoaluminum oxy-compounds represented by the following general formula [5].

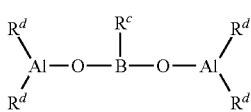

In the formula, $R^c$ is a hydrocarbon group having 1 to 10 carbon atoms; and $R^d$ may be the same as or different from one another, and are each a hydrogen atom, a halogen atom or a hydrocarbon group having 1 to 10 carbon atoms.

The organoaluminum oxy-compounds represented by the general formulae [2] to [5] may be used singly, or two or more kinds may be used in combination.

[Compound (b-2) that Reacts with Transition Metal Compound (A) to Form an Ion Pair]

Examples of the compound (b-2) that reacts with the transition metal compound (A) to form an ion pair (hereinafter, also abbreviated as an "ionic compound") include Lewis acids, ionic compounds, borane compounds and carborane compounds as described in JP-A-H01-501950, JP-A-H01-502036, JP-A-H03-179005, JP-A-H03-179006, JP-A-H03-207703, JP-A-H03-207704 and U.S. Pat. No. 5,321,106. Further examples include heteropoly compounds and isopoly compounds.

The ionic compound (b-2) that is preferably employed in the present invention is a borate compound represented by the following general formula [6].

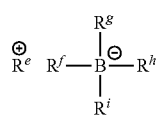

In the formula, $R^{e+}$ is, for example, carbenium cation, oxonium cation, ammonium cation, phosphonium cation, cycloheptyltrienyl cation or ferrocenium cation having a transition metal; and $R^f$ to $R^i$ may be the same as or different from each other and are each an organic group, preferably an aryl group.

Examples of the carbenium cation include tri-substituted carbenium cations such as triphenylcarbenium cation, tris(methylphenyl)carbenium cation and tris(dimethylphenyl)carbenium cation.

Examples of the ammonium cation include trialkylammonium cations such as trimethylammonium cation, triethylammonium cation, tri(n-propyl)ammonium cation, triisopropylammonium cation, tri(n-butyl)ammonium cation and triisobutylammonium cation; N,N-dialkylanilinium cations such as N,N-dimethylanilinium cation, N,N-diethylanilinium cation and N,N,2,4,6-pentamethylanilinium cation; and dialkylammonium cations such as diisopropylammonium cation and dicyclohexylammonium cation.

Examples of the phosphonium cation include triarylphosphonium cations such as triphenylphosphonium cation, tris(methylphenyl)phosphonium cation and tris(dimethylphenyl)phosphonium cation.

Of the above, $R^{e+}$ is preferably carbenium cation or ammonium cation; particularly preferably triphenylcarbenium cation, N,N-dimethylanilinium cation or N,N-diethylanilinium cation.

Specific examples of carbenium salts include triphenylcarbenium tetraphenylborate, triphenylcarbenium tetrakis(pentafluorophenyl)borate, triphenylcarbenium tetrakis(3,5-ditrifluoromethylphenyl)borate, tris(4-methylphenyl)carbenium tetrakis(pentafluorophenyl)borate and tris(3,5-dimethylphenyl)carbenium tetrakis(pentafluorophenyl)borate.

Examples of ammonium salts include trialkyl-substituted ammonium salts, N,N-dialkylanilinium salts and dialkylammonium salts.

Specific examples of the trialkyl-substituted ammonium salts include triethylammoniumtetraphenylborate, tripropylammoniumtetraphenylborate, tri(n-butyl)ammoniumtetraphenylborate, trimethylammoniumtetrakis(p-tolyl)borate, trimethylammoniumtetrakis(o-tolyl)borate, tri(n-butyl)ammoniumtetrakis(pentafluorophenyl)borate, triethylammoniumtetrakis(pentafluorophenyl)borate, tripropylammoniumtetrakis(pentafluorophenyl)borate, tripropylammoniumtetrakis(2,4-dimethylphenyl)borate, tri(n-butyl)ammoniumtetrakis(3,5-dimethylphenyl)borate, tri(n-butyl)ammoniumtetrakis(4-trifluoromethylphenyl)borate, tri(n-butyl)ammoniumtetrakis(3,5-ditrifluoromethylphenyl)borate, tri(n-butyl)ammoniumtetrakis(o-tolyl)borate, dioctadecylmethylammoniumtetraphenylborate, dioctadecylmethylammoniumtetrakis(p-tolyl)borate, dioctadecylmethylammoniumtetrakis(o-tolyl)borate, dioctadecylmethylammoniumtetrakis(pentafluorophenyl)borate, dioctadecylmethylammoniumtetrakis(2,4-dimethylphenyl)borate, dioctadecylmethylammoniumtetrakis(3,5-dimethylphenyl)borate, dioctadecylmethylammoniumtetrakis(4-trifluoromethylphenyl)borate, dioctadecylmethylammoniumtetrakis(3,5-ditrifluoromethylphenyl)borate and dioctadecylmethylammonium.

Specific examples of the N,N-dialkylanilinium salts include N,N-dimethylaniliniumtetraphenylborate, N,N-dimethylaniliniumtetrakis(pentafluorophenyl)borate, N,N-dimethylaniliniumtetrakis(3,5-ditrifluoromethylphenyl)borate, N,N-diethylaniliniumtetraphenylborate, N,N-diethylaniliniumtetrakis(pentafluorophenyl)borate, N,N-diethylaniliniumtetrakis(3,5-ditrifluoromethylphenyl)borate, N,N-2,4,6-pentamethylaniliniumtetraphenylborate and N,N-2,4,6-pentamethylaniliniumtetrakis(pentafluorophenyl)borate.

Specific examples of the dialkylammonium salts include di(1-propyl)ammoniumtetrakis(pentafluorophenyl)borate and dicyclohexylammoniumtetraphenylborate.

Furthermore, ionic compounds disclosed by the present applicant (JP-A-2004-51676) are employable without limitation.

The ionic compounds (b-2) may be used singly, or two or more kinds may be used in combination.

[Organoaluminum Compound (b-3)]

Examples of the organoaluminum compound (b-3) that forms the olefin polymerization catalyst include organoaluminum compounds represented by the following general formula [7] and alkyl complex compounds containing a Group 1 metal and aluminum represented by the following general formula [8].

Organoaluminum Compounds Represented by:

$$R^a{}_m Al(OR^b)_n H_p X_q \quad [7]$$

wherein $R^a$ and $R^b$ may be the same as or different from each other and are each a hydrocarbon group having 1 to 15 carbon atoms, preferably 1 to 4 carbon atoms; X is a halogen atom; $0<m\leq3$; $0\leq n<3$; $0\leq p<3$; $0\leq q<3$; and $m+n+p+q=3$.

Specific examples of such compounds include:

tri(n-alkyl)aluminums such as trimethylaluminum, triethylaluminum, tri(n-butyl)aluminum, tri(n-hexyl)aluminum and tri(n-octyl)aluminum;

branched-chain trialkylaluminums such as triisopropylaluminum, triisobutylaluminum, tri(sec-butyl)aluminum, tri(tert-butyl)aluminum, tri(2-methylbutyl)aluminum, tri(3-methylhexyl)aluminum and tri(2-ethylhexyl)aluminum;

tricycloalkylaluminums such as tricyclohexylaluminum and tricyclooctylaluminum;

triarylaluminums such as triphenylaluminum and tritolylaluminum;

dialkylaluminumhydrides such as diisopropylaluminumhydride and diisobutylaluminumhydride;

alkenylaluminums such as those represented by the general formula: $(i-C_4H_9)_x Al_y (C_5H_{10})_z$ (wherein x, y and z are each a positive number, and $z\leq2x$) with examples including isoprenylaluminum;

alkylaluminum alkoxides such as isobutylaluminum methoxide and isobutylaluminum ethoxide;

dialkylaluminum alkoxides such as dimethylaluminum methoxide, diethylaluminum ethoxide and dibutylaluminum butoxide;

alkylaluminum sesquialkoxides such as ethylaluminum sesquiethoxide and butylaluminum sesquibutoxide;

partially alkoxylated alkylaluminums such as those having an average composition represented by $R^a{}_{2.5}Al(OR^b)_{0.5}$;

alkylaluminum aryloxides such as diethylaluminum phenoxide and diethylaluminum(2,6-di-t-butyl-4-methylphenoxide);

dialkylaluminum halides such as dimethylaluminum chloride, diethylaluminum chloride, dibutylaluminum chloride, diethylaluminum bromide and diisobutylaluminum chloride;

alkylaluminum sesquihalides such as ethylaluminum sesquichloride, butylaluminum sesquichloride and ethylaluminum sesquibromide;

partially halogenated alkylaluminums such as alkylaluminum dihalides including ethylaluminum dichloride;

dialkylaluminum hydrides such as diethylaluminum hydride and diisobutylaluminum hydride;

partially hydrogenated alkylaluminums such as alkylaluminum dihydrides including ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

Alkyl complex compounds containing a Group 1 metal of the periodic table and aluminum, represented by:

$$M^2 AlR^a{}_4 \quad [8]$$

wherein $M^2$ is Li, Na or K; and $R^a$ is a hydrocarbon group having 1 to 15 carbon atoms, preferably 1 to 4 carbon atoms.

Examples of such compounds include $LiAl(C_2H_5)_4$ and $LiAl(C_7H_{15})_4$.

Compounds analogous to the compound represented by the general formula [8] are also employable. Examples of such compounds include organoaluminum compounds wherein two or more aluminum compounds are bonded via a nitrogen atom, such as $(C_2H_5)_2AlN(C_2H_5)Al(C_2H_5)_2$.

In terms of easy availability, as the organoaluminum compound (b-3), triethylaluminum, triisobutylaluminum, tri(n-octyl)aluminum and diisobutylaluminumhydride are preferably used.

The organoaluminum compounds (b-3) may be used singly, or two or more kinds may be used in combination.

The olefin polymerization catalyst used in the present invention may further comprise a carrier (C) as required, together with the transition metal compound (A) and the organometallic compound (B).

[Carrier (C)]

The carrier (C) used in the present invention is an inorganic or organic compound in the form of granular or fine particulate solid. Preferred inorganic compounds include porous oxides, inorganic chlorides, clays, clay minerals and ion-exchange layered compounds.

Examples of the porous oxides include $SiO_2$, $Al_2O_3$, MgO, ZrO, $TiO_2$, $B_2O_3$, CaO, ZnO, BaO, $ThO_2$, and composites or mixtures containing these oxides, such as natural or synthetic zeolite, $SiO_2$—MgO, $SiO_2$—$Al_2O_3$, $SiO_2$—$TiO_2$, $SiO_2 V_2O_5$, $SiO_2$—$Cr_2O_3$ and $SiO_2$—$TiO_2$—MgO. Of these, oxides containing $SiO_2$ and/or $Al_2O_3$ as a main component are preferable. The porous oxides have different properties depending on the types and preparation processes. The carrier preferably used in the present invention has a particle diameter of 10 to 300 μm, preferably 20 to 200 μm, a specific surface area of 50 to 1,000 m$^2$/g, preferably 100 to 700 m$^2$/g, and a pore volume of 0.3 to 3.0 cm$^3$/g. If necessary, the carrier may be calcined at 100 to 1,000° C., preferably at 150 to 700° C. prior to use.

Examples of the inorganic chlorides include $MgCl_2$, $MgBr_2$, $MnCl_2$ and $MnBr_2$. The inorganic chlorides may be used as they are, or may be used after pulverized with, for example, a ball mill or a vibration mill. The inorganic chlorides may be used after they are dissolved in a solvent such as alcohol and precipitated as fine particles with a precipitating agent.

The clays used in the present invention are, usually, mainly composed of clay minerals. The ion-exchange layered compounds used in the present invention have crystal structures in which planes formed by ionic bonding or the like are stacked by weak bond energy in parallel and contain exchangeable ions. Most clay minerals are ion-exchange layered compounds. The clays, the clay minerals and the ion-exchange layered compounds that are employable are not limited to natural compounds but include synthetic products. Further examples of such clays, clay minerals and ion-exchange layered compounds include clays, clay minerals and ion crystalline compounds having layered crystal structures such as hexagonal closest packing structure, antimony structure, $CdCl_2$ structure and $CdI_2$ structure. Examples of the clays and the clay minerals include kaolin, bentonite, kibushi clay, gairome clay, allophane, hisingerite, pyrophyllite, mica, montmorillonite, vermiculite, chlorite, palygorskite, kaolinite, nacrite, dickite and halloysite. Examples of the ion-exchange layered compounds include crystalline acidic salts of polyvalent metals such as $\alpha$-Zr(HAsO$_4$)$_2$·H$_2$O, $\alpha$-Zr(HPO$_4$)$_2$, $\alpha$-Zr(KPO$_4$)$_2$·3H$_2$O, $\alpha$-Ti(HPO$_4$)$_2$, $\alpha$-Ti(HAsO$_4$)$_2$·H$_2$O, $\alpha$-Sn(HPO$_4$)$_2$·H$_2$O, $\gamma$-Zr(HPO$_4$)$_2$, $\gamma$-Ti(HPO$_4$)$_2$ and $\gamma$-Ti(NH$_4$PO$_4$)$_2$·H$_2$O. It is also preferable that the clays and the clay minerals used in the present invention are subjected to chemical treatments. As chemical treatments, for example, a surface treatment to remove impurities adhered on the surface and a treatment to affect the crystal structure of the clay are employable. Specific examples of such chemical treatments include acid treatment, alkali treatment, salt treatment and organic substance treatment.

The ion-exchange layered compounds used in the present invention, by utilizing ion exchange properties and exchanging exchangeable ions between layers with other larger and bulkier ions, may be those having enlarged interlayer distance. The bulky ions play a pillar-like roll to support the layered structure and are generally called pillars. The introduction of other substances into between layers of the layered compounds is called intercalation. Examples of guest compounds to be intercalated include cationic inorganic compounds such as TiCl$_4$ and ZrCl$_4$; metal alkoxides such as Ti(OR)$_4$, Zr(OR)$_4$, PO(OR)$_3$ and B(OR)$_3$ (R is a hydrocarbon group or the like); and metal hydroxide ions such as [Al$_{13}$O$_4$(OH)$_{24}$]$^{7+}$, [Zr$_4$(OH)$_{14}$]$^{2+}$ and [Fe$_3$O(OCOCH$_3$)$_6$]$^+$. These compounds may be used singly, or two or more kinds may be used in combination. The intercalation of these compounds may be carried out in the presence of polymers obtained by hydrolysis of metal alkoxides such as Si(OR)$_4$, Al(OR)$_3$ and Ge(OR)$_4$ (R is a hydrocarbon group or the like) or in the presence of colloidal inorganic compounds such as SiO$_2$. Examples of the pillars include oxides produced by intercalation of the above metal hydroxide ions into between layers followed by thermal dehydration. Of these, the clays and the clay minerals are preferable; and montmorillonite, vermiculite, pectolite, taeniolite and synthetic mica are particularly preferable.

Examples of the organic compounds as the carrier (C) include granular or fine particulate solids having a particle diameter of 10 to 300 μm. Specific examples of such compounds include (co)polymers produced by using α-olefins having 2 to 14 carbon atoms such as ethylene, propylene, 1-butene and 4-methyl-1-pentene as a main component; (co)polymers produced by using vinylcyclohexane or styrene as a main component; and modified products of these (co)polymers.

The carriers (C) may be used singly, or two or more kinds may be used in combination.

The olefin polymerization catalyst used in the present invention may further comprise an organic compound (D), together with the transition metal compound (A) and the organometallic compound component (B), and the carrier (C) used as an optional component.

[Organic Compound (D)]

The organic compound (D) used in the present invention is optionally used to improve polymerization performance and properties of the obtainable polymers. Examples of such organic compounds include, but are not limited to, alcohols, phenolic compounds, carboxylic acids, phosphorus compounds and sulfonates.

The organic compounds (D) may be used singly, or two or more kinds may be used in combination.

In polymerization, the usage method and the order of addition of the above components are arbitrarily selected. Exemplary methods are given below.

(1) The transition metal compound (A) alone is added to a polymerization reactor.

(2) The transition metal compound (A) and the organometallic compound (B) are added to a polymerization reactor in any order.

(3) A catalyst component in which the transition metal compound (A) is supported on the carrier (C), and the organometallic compound (B) are added to a polymerization reactor in any order.

(4) A catalyst component in which the organometallic compound (B) is supported on the carrier (C), and the transition metal compound (A) are added to a polymerization reactor in any order.

(5) A catalyst in which the transition metal compound (A) and the organometallic compound (B) are supported on the carrier (C) is added to a polymerization reactor.

In the methods (1) to (5), the organic compound (D) may be added to a polymerization reactor in any order, or may be added to a polymerization reactor after contacted with at least one of the components (A) to (C). In the methods (2) to (5), two or more of the catalyst components may be contacted with one another beforehand.

In the methods (4) and (5) in which the organometallic compound (B) is supported, an unsupported organometallic compound (B) may be added in any order as required. In this case, the organometallic compounds (B) may be the same as or different from each other.

The solid catalyst component wherein the transition metal compound (A) alone is supported on the component (C), or the solid catalyst component wherein the transition metal compound (A) and the organometallic compound (B) are supported on the component (C) may be prepolymerized with an olefin. Further, an additional catalyst component may be supported on the prepolymerized solid catalyst component.

In the olefin polymer production process according to the present invention, in the presence of the above olefin polymerization catalyst, an α-olefin having 3 to 10 carbon atoms and ethylene are polymerized to give an α-olefin polymer.

<α-Olefin>

Examples of α-olefins having 3 to 10 carbon atoms employable in the present invention include propylene, 1-butene, 1-pentene, 1-hexene, 1-heptene, 1-octene, 1-nonene, 1-decene, 3-methyl-1-butene, 3-methyl-1-pentene, 4-methyl-1-pentene, 3-ethyl-1-pentene, 4-methyl-1-hexene, 4,4-dimethyl-1-hexene, 4,4-dimethyl-1-pentene, 4-ethyl-1-hexene and 3-ethyl-1-hexene. Of these, the α-olefins having 3 to 8 carbon atoms are preferable; the α-olefins having 3 to 6 carbon atoms are more preferable; and propylene, 1-butene, 1-hexene and 4-methyl-1-pentene are particularly preferable.

These α-olefins having 3 to 10 carbon atoms may be used singly, or two or more kinds may be used in combination. The α-olefins may be selected appropriately so that the obtainable polymer will have desired properties. For example, the α-olefins may be selected appropriately so that the polymer and a mixture containing the polymer will have desired properties after vulcanization.

<Production Process of Olefin Polymer>

The present invention may be carried out by liquid-phase polymerization such as solution polymerization or suspension polymerization, or by gas-phase polymerization.

Specific examples of an inert hydrocarbon medium (inert hydrocarbon solvent) used in the liquid-phase polymerization include aliphatic hydrocarbons such as propane, butane, pentane, hexane, heptane, octane, decane, dodecane, ethylene chloride, dichloromethane and kerosine; alicyclic hydrocarbons such as cyclopentane, cyclohexane and methylcyclopentane; aromatic hydrocarbons such as benzene, toluene, chlorobenzene and xylene; and mixtures thereof. The α-olefin itself may be used as a solvent.

In carrying out olefin polymerization using the olefin polymerization catalyst described above, the transition metal compound (A) is generally used such that the amount thereof per liter of the reaction volume is in the range of $10^{-9}$ to $10^{-1}$ mol, and preferably $10^{-8}$ to $10^{-2}$ mol.

The organoaluminum oxy-compound (b-1) is used such that the molar ratio [(b-1)/M] relative to all the transition metal atoms (M) in the transition metal compound (A) is usually in the range of 0.01 to 50,000, preferably 0.05 to 2,000. The ionic compound (b-2) is used such that the molar ratio [(b-2)/M] of the ionic compound (b-2) to all the transition metal atoms (M) in the transition metal compound (A) is usually in the range of 0.01 to 50,000, preferably 0.05 to 2,000. The organoaluminum compound (b-3) is used such that the molar ratio [(b-3)/M] of the aluminum atoms in the organoaluminum compound (b-3) to all the transition metal atoms (M) in the transition metal compound (A) is usually in the range of 0.01 to 5,000, and preferably 0.05 to 2,000.

The temperature of the olefin polymerization using such an olefin polymerization catalyst is usually in the range of +25 to +200° C., preferably +25 to +170° C., more preferably +30 to +150° C. The polymerization temperature, which varies depending on the molecular weight of the obtainable α-olefin polymer and polymerization activity of the olefin polymerization catalyst, is preferably +30° C. or higher in view of productivity.

The polymerization pressure is usually from atmospheric pressure to 10 MPa gauge pressure, and preferably from atmospheric pressure to 5 MPa gauge pressure. The polymerization reaction may be carried out batchwise, semi-continuously or continuously. The polymerization may be carried out in two or more stages under different reaction conditions.

The molecular weight of the obtainable olefin polymers may be controlled by use of hydrogen in the polymerization system or by adjusting the polymerization temperature. When hydrogen is added, the amount thereof is preferably about 0.001 to 100 NL based on 1 kg of the olefin. The molecular weight of the obtainable olefin polymers may be controlled also by changing the amount of the component (B). At this time, specific examples of the component (B) include triisobutylaluminum, methylaluminoxane and diethyl zinc.

The olefin polymer production process of the present invention is characterized by limiting the ethylene feeding amount in the polymerization reaction system to be a specific amount. This is described as follows. When an α-olefin having 3 to 10 carbon atoms is fed as a gas, ethylene and the α-olefin having 3 to 10 carbon atoms each may be fed into a polymerization reactor continuously, or may be fed into a polymerization reactor intermittently. Provided that the molar amounts of ethylene and an α-olefin having 3 to 10 carbon atoms that are fed into a polymerization reactor are $P_E$ and $P_O$, respectively, and when a whole amount of ethylene fed is assumed to be dissolved in a liquid in view of a slight ethylene-feeding amount, the present invention defines the molar ratio: $P_E/P_O$ in the liquid. In this case, the present invention is characterized by satisfying the relationship: $0.001 \leq P_E/P_O \leq 0.030$. As long as the ratio is within this range, ethylene may be arbitrarily used. The ratio is preferably $0.001 \leq P_E/P_O \leq 0.020$, more preferably $0.001 \leq P_E/P_O \leq 0.010$, most preferably $0.001 \leq P_E/P_O \leq 0.005$.

On the other hand, when an α-olefin having 3 to 10 carbon atoms is fed as a liquid, provided that the molar amounts of ethylene and an α-olefin having 3 to 10 carbon atoms that are fed into a polymerization reactor are $P_E$ and $P_O$, respectively, and when ethylene fed is assumed to be dissolved in the α-olefin having 3 to 10 carbon atoms, the present invention defines the molar ratio $P_E/P_O$ in the liquid. In this case, the present invention is characterized by satisfying the relationship: $0.001 \leq P_E/P_O \leq 0.030$. As long as the ratio is within this range, ethylene may be arbitrarily used. The ratio is preferably $0.001 \leq P_E/P_O \leq 0.020$, more preferably $0.001 \leq P_E/P_O \leq 0.010$, most preferably $0.001 \leq P_E/P_O \leq 0.005$.

In the olefin polymer production process of the present invention, a trace amount of ethylene is polymerized to such a degree as to improve polymerization activity and allow the α-olefin polymer to have increased molecular weight. Thereby, a syndiotactic α-olefin polymer having high melting point can be produced. As mentioned above, in using metallocene catalysts for the polymerization of propylene, the presence of a dormant catalyst species with propylene 2,1-insersion is known; likewise, in the polymerization of α-olefins having 3 to 10 carbon atoms, too, the presence of a similar dormant catalyst species is presumable. Here, allowing ethylene in an amount defined above to make reaction is considered to be able to reactivate the dormant catalyst species to thereby improve the activity, and moreover prevent polymer chains from being eliminated from the catalyst species, thus enabling to resume the dormant growth reaction of the polymer chains and consequently allowing the α-olefin polymer to have increased molecular weight. Surprisingly, it is characteristic that the increased effect is more significant in the production of the syndiotactic α-olefin polymer rather than in the production of the isotactic α-olefin polymer.

<Olefin Polymer>

Next, olefin polymers obtained by the production process of the present invention are described. The olefin polymers obtained by the production process of the present invention have the following four characteristics.

[Characteristic 1] The olefin polymer comprises a structural unit X derived from at least one α-olefin selected from α-olefins having 3 to 10 carbon atoms and a structural unit Y derived from ethylene, and provided that the content of the structural unit X in the polymer is x (mol %) and the content of the structural unit Y in the polymer is y (mol %), the polymer satisfies: $98.5 \leq x \leq 99.9$, $1.5 \geq y \geq 0.1$ and $x+y=100$; preferably $98.6 \leq x \leq 99.9$, $1.4 \geq y \geq 0.1$ and $x+y=100$; more preferably $98.7 \leq x \leq 99.9$, $1.3 \geq y \geq 0.1$ and $x+y=100$; most preferably $98.8 \leq x \leq 99.9$, $1.2 \geq y \geq 0.1$ and $x+y=100$. The olefin polymer produced by the production process of the present invention, in spite of containing a trace amount of the unit derived from ethylene, maintains high racemic diad fraction and high melting point, and has increased molecular weight. If the ethylene content y is more than the range defined above, the olefin polymer has lowered melting point and moreover lowered crystallization temperature (Tc), and thus may have deteriorated molding processability.

[Characteristic 2] The racemic diad fraction ([r]) as measured by $^{13}$C-NMR is 90%≤[r]<100%, preferably 95%≤[r]<100%, more preferably 97%≤[r]<100%, most preferably 98%≤[r] <100%. The olefin polymer produced by the production process of the present invention has high racemic diad fraction, and therefore, the olefin polymer, in spite of containing a trace amount of the unit derived from ethylene, maintains high melting point.

[Characteristic 3] The intrinsic viscosity ([η]) as measured at 135° C. in decalin is 0.70 dl/g or more, preferably 0.75 dl/g or more, more preferably 0.80 dl/g or more, most preferably 0.85 dl/g or more. The olefin polymer having high molecular weight is expected to show good strength and molding processability.

[Characteristic 4] The melting point (Tm) as determined by differential scanning calorimetry (DSC) is 145° C. or higher, preferably Tm≥147° C., more preferably Tm≥149° C., most preferably Tm≥151° C. The olefin polymer produced by the production process of the present invention, in spite of containing a trace amount of the unit derived from ethylene, maintains high racemic diad fraction and high melting point, and has increased molecular weight.

The olefin polymer of the present invention, in spite of containing a trace amount of the unit derived from ethylene, maintains high racemic diad fraction and high melting point, and has high molecular weight.

This is considered to be due to the syndiotacticity of the α-olefin sequences. It is known that the syndiotacticity can adopt plural energetically-stabilized crystal structures including helical structure and planar zigzag structure and reversible phase transition being possible between some of these crystal structures. In the case of the isotactic polypropylene, the structure is dominated by helical structure in which three molecules of propylene are present per turn of the helix, and thus, the inclusion into such structure of the unit derived from ethylene even in a trace amount greatly affects the constituent crystal structure, and consequently the isotactic polypropylene tends to have a lowered melting point. On the other hand, in the case of the syndiotactic polypropylene, the influence of the unit derived from ethylene on the crystal structure is presumed to be minimized by the plural energetically-stabilized crystal structures, and consequently the syndiotactic polypropylene hardly has a lowered melting point. Since similar effect is seen also in a syndiotactic α-olefin polymer other than the syndiotactic propylene, this phenomenon is considered to be characteristic to the syndiotactic structure.

EXAMPLES

Hereinafter, the present invention is described more specifically with reference to examples, but the present invention is in no way limited by these examples. First of all, methods for measuring properties of the olefin polymers obtained by the production process of the present invention are described.

<Intrinsic Viscosity [η]>

The intrinsic viscosity is a value measured at 135° C. in decalin.

<Melting Point (Tm), Crystallization Temperature (Tc), Amount of Heat of Fusion (ΔH(Tm))>

With regard to a 4-methyl-1-pentene polymer, the following operation was performed. A differential scanning calorimeter manufactured by SII NanoTechnology Inc.: EXSTAR 6000DSC was employed. Under the stream of nitrogen (20 mL/min), the specimen (about 5 mg) was heated to 270° C. at 10° C./min and was held at 270° C. for 5 minutes, and then the specimen was cooled to 0° C. at −10° C./min and was held at 0° C. for 5 minutes, and heated to 270° C. at 10° C./min. At this time, a top of a crystallization temperature peak at the time of cooling was defined as a crystallization temperature (Tc). A top of a crystal melting peak at the time of the second heating was defined as a melting point (Tm). From an integrated value of the peak, an amount of heat of fusion (ΔH (Tm)) was calculated.

With regard to a propylene polymer, the following operation was performed. A differential scanning calorimeter manufactured by SII NanoTechnology Inc.: EXSTAR 6000DSC was employed. Under the stream of nitrogen (20 mL/min), the specimen (about 5 mg) was heated to 230° C. at 10° C./min and was held at 230° C. for 10 minutes, and then the specimen was cooled to 30° C. at −10° C./min and was held at 30° C. for 5 minutes, and heated to 230° C. at 10° C./min. At this time, a top of a crystallization temperature peak at the time of cooling was defined as a crystallization temperature (Tc). A top of a crystal melting peak at the time of the second heating was defined as a melting point (Tm). From an integrated value of the peak, an amount of heat of fusion (ΔH(Tm)) was calculated.

With regard to an olefin polymer obtained in Examples and Comparative Examples, when two or more crystal melting peaks were observed, a top of a peak at the highest melting point side was defined as a melting point (Tm) of the olefin polymer.

<Stereoregularity and Ethylene Content>

As a measurement solvent, o-dichlorobenzene-$d_4$/benzene-$d_6$ (4/1[v/v]) and 1,1,2,2-tetrachloroethane-$d_2$ were used. At a measurement temperature of 120° C., $^{13}$C-NMR spectrum (125 MHz, ECP500 manufactured by JOEL Ltd., and 100 MHz, ECX400P manufactured by JOEL Ltd.) was measured to calculate a racemic diad fraction ([r]) of an olefin polymer. The calculation was performed neglecting the influence of ethylene insertion. For example, the racemic diad fraction ([r]) of a polymer containing 4-methyl-1-pentene as a main component was calculated by defining an integral value of a signal derived from a racemic structure (approximately at 42.7 ppm) as "A" and an integral value of a signal derived from a meso structure (approximately at 42.4 ppm) as "B", and on the basis of the meso diad fraction ([m])/the racemic diad fraction ([r])=B/A and [m]+[r]=100. The racemic diad fraction ([r]) of a polymer containing propylene as a main component can be calculated with reference to publicly known documents. On the other hand, the ethylene content was determined by $^{13}$C-NMR spectrum, with reference to (Macromolecules, 1982, 15, 1150).

<Molar Ratio>

Among α-olefins having 3 to 10 carbon atoms, as an example of a gas, propylene is described, and as an example of a liquid, 4-methyl-1-pentene is described. As described above, in the case of propylene, when the molar amount of ethylene fed was defined as $M_E$ and the molar amount of propylene fed was defined as $M_O$, the molar ratio $M_E/M_O$ (ethylene flow rate/propylene flow rate) was calculated. In the case of 4-methyl-1-pentene, when the molar amount of ethylene fed was defined as $P_E$ and the molar amount of 4-methyl-1-pentene fed was defined as $P_O$, the molar ratio of $P_E/P_O$ (ethylene flow rate/4-methyl-1-pentene introducing amount) was calculated.

<Transition Metal Compound (A)>

The transition metal compound (A) was synthesized by methods described in the following Patent Literatures: JP-A-2000-212194, JP-A-2004-168744, JP-A-2004-189666, JP-A-2004-161957, JP-A-2007-302854, JP-A-2007-302853, WO01/027124, JP-A-2001-526730 and JP-A-H10-226694.

Transition Metal Compound (a1): dibenzylmethylene(cyclopentadienyl)(3,6-di-tert-butylfluorenyl)zirconiumdichloride

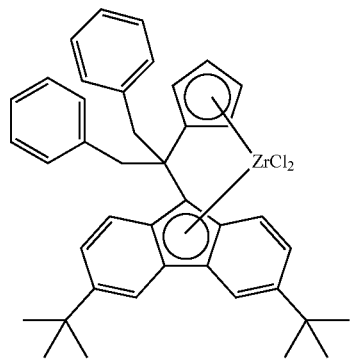

Transition Metal Compound (a2): dibenzylmethylene(cyclopentadienyl)(2,7-di-p-chlorophenyl-3,6-di-tert-butylfluorenyl)zirconiumdichloride

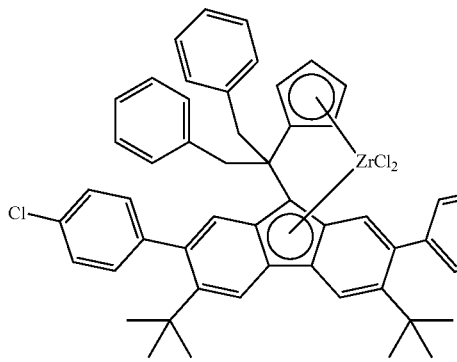

Transition Metal Compound (a3): diphenylmethylene(3-tert-butyl-5-methylcyclopentadienyl)(2,7-di-tert-butylfluorenyl)zirconiumdichloride

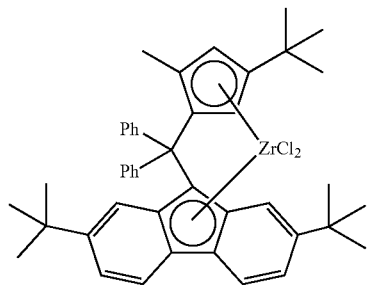

Transition Metal Compound (a4): dibenzylmethylene(cyclopentadienyl)(2,7-diphenyl-3,6-di-tert-butylfluorenyl)zirconiumdichloride

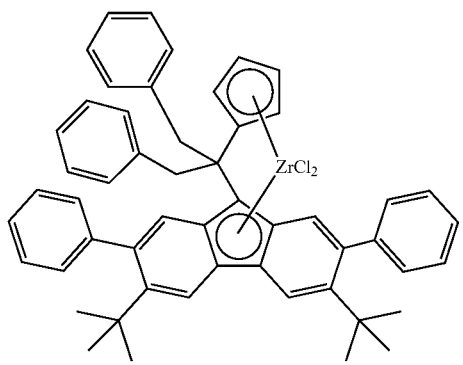

Transition Metal Compound (a5): di-p-chlorobenzylmethylene(cyclopentadienyl)(2,7-diphenyl-3,6-di-tert-butylfluorenyl)zirconiumdichloride

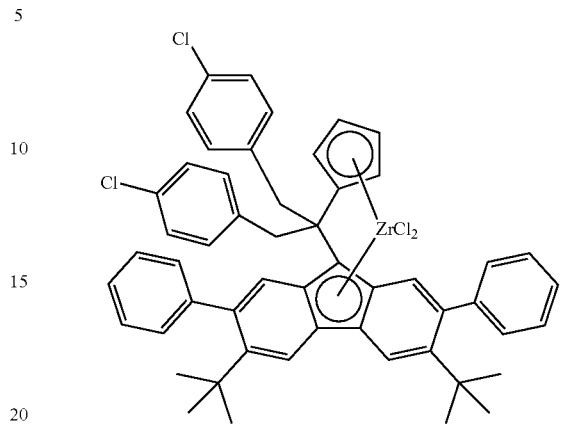

Example 1

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 30° C. On the other hand, into a sufficiently nitrogen-purged 30 mL side-arm flask, a magnetic stirrer was placed, and thereto, 1.31 mL (Al=2 mmol) of a hexane solution of methylaluminoxane (Al concentration: 1.52 mol/L) manufactured by Tosoh Finechem Corporation, and then 2.79 mg (0.004 mmol) of dibenzylmethylene(cyclopentadienyl)(3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0 M) was added, and then the above solution was added to the autoclave. Through the glass blowing tube, a mixed gas of 2.5 NL/h of nitrogen and 0.5 NL/h of ethylene was flown to initiate polymerization. In the polymerization atmosphere: $P_O$ was 1.5875 and $P_E$ was 0.0037, and thus $P_E/P_O$ was calculated to be 0.0023. The mixed gas of nitrogen and ethylene was continuously fed during polymerization and under ordinary pressure at 30° C. for 10 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 4.90 g of the 4-methyl-1-pentene polymer was obtained. The polymerization activity was 7.35 kg/mmol-Zr·hr. With regard to the 4-methyl-1-pentene polymer obtained: [η] was 0.88 dl/g, Tc was 153° C., Tm was 201° C., ΔH(Tm) was 14.2 mJ/mg, ethylene content was 0.2%, and [r] was 98.2%.

Example 2

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 30° C. On the other hand, into a sufficiently nitrogen-purged 30 mL side-arm flask, a magnetic stirrer was placed, and thereto, 1.31 mL (Al=2 mmol) of a hexane solution of methylaluminoxane (Al concentration: 1.52 mol/L) manufactured by Tosoh Finechem Corporation, and then 2.79 mg (0.004 mmol) of dibenzylmethylene(cyclopentadienyl)(3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0M) was added, and then the above solution was added to the autoclave. Through the glass blowing tube, a mixed gas of 10 NL/h of nitrogen and 2 NL/h of ethylene was flown to initiate polymerization. In the polymerization atmosphere: $P_O$ was 1.5875 and $P_E$ was 0.0074, and thus $P_E/P_O$ was calculated to be 0.0047. The mixed gas of nitrogen and ethylene was continuously fed during polymerization and under ordinary pressure at 30° C. for 5 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 2.59 g of the 4-methyl-1-pentene polymer was obtained. The polymerization activity was 7.77 kg/mmol-Zr·hr. With regard to the 4-methyl-1-pentene polymer obtained, the intrinsic viscosity [η] was 0.98 dl/g, Tc was 149° C., Tm was 199° C., ΔH(Tm) was 15.1 mJ/mg, ethylene content was 0.4%, and [r] was 97.7%.

Example 3

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 30° C. On the other hand, into a sufficiently nitrogen-purged 30 mL side-arm flask, a magnetic stirrer was placed, and thereto, 1.31 mL (Al=mmol) of a hexane solution of methylaluminoxane (Al concentration: 1.52 mol/L) manufactured by Tosoh Finechem Corporation, and then 2.79 mg (0.004 mmol) of dibenzylmethylene(cyclopentadienyl)(3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0M) was added, and then the above solution was added to the autoclave. Through the glass blowing tube, a mixed gas of 10 NL/h of nitrogen and 6 NL/h of ethylene was flown to initiate polymerization. In the polymerization atmosphere: $P_O$ was 1.5875 and $P_E$ was 0.0223, and thus $P_E/P_O$ was calculated to be 0.0141. The mixed gas of nitrogen and ethylene was continuously fed during polymerization and under ordinary pressure at 30° C. for 5 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 2.96 g of the 4-methyl-1-pentene polymer was obtained. The polymerization activity was 8.88 kg/mmol-Zr·hr. With regard to the 4-methyl-1-pentene polymer obtained: the intrinsic viscosity [η] was 1.10 dl/g, Tc was 143° C., Tm was 197° C., ΔH(Tm) was 13.7 mJ/mg, ethylene content was 0.6%, and [r] was 97.6%.

Example 4

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 30° C. On the other hand, into a sufficiently nitrogen-purged 30 mL side-arm flask, a magnetic stirrer was placed, and thereto, 1.31 mL (Al=mmol) of a hexane solution of methylaluminoxane (Al concentration: 1.52 mol/L) manufactured by Tosoh Finechem Corporation, and then 2.79 mg (0.004 mmol) of dibenzylmethylene(cyclopentadienyl)(3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0M) was added, and then the above solution was added to the autoclave. Through the glass blowing tube, a mixed gas of 10 NL/h of nitrogen and 10 NL/h of ethylene was flown to initiate polymerization. In the polymerization atmosphere: $P_O$ was 1.5875 and $P_E$=molar amount of ethylene was 0.0372, and thus $P_E/P_O$ was calculated to be 0.0234. The mixed gas of nitrogen and ethylene was continuously fed during polymerization and under ordinary pressure at 30° C. for 5 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 3.18 g of the 4-methyl-1-pentene polymer was obtained. The polymerization activity was 9.54 kg/mmol-Zr·hr. With regard to the 4-methyl-1-pentene polymer obtained: the intrinsic viscosity [η] was 1.18 dl/g, Tc was 139° C., Tm was 195° C., ΔH(Tm) was 12.7 mJ/mg, ethylene content was 1.0%, and [r] was 97.9%.

Comparative Example 1

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 30° C. On the other hand, into a sufficiently nitrogen-purged 30 mL side-arm flask, a magnetic stirrer was placed, and thereto, 1.31 mL (Al=mmol) of a hexane solution of methylaluminoxane (Al concentration: 1.52 mol/L) manufactured by Tosoh Finechem Corporation, and then 2.79 mg (0.004 mmol) of dibenzylmethylene(cyclopentadienyl)(3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0M) was added, and then the above solution was added to the autoclave. Through the glass blowing tube, 50 NL/h of nitrogen was flown to initiate polymerization. Nitrogen was continuously fed during polymerization and under ordinary pressure at 30° C. for 30 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 0.43 g of the 4-methyl-1-pentene polymer was obtained. The polymerization activity was 0.22 kg/mmol-Zr·hr. With regard to the 4-methyl-1-pentene polymer obtained: the intrinsic viscosity [η] was 0.60 dl/g, Tc was 155° C., Tm was 204° C., ΔH(Tm) was 20.3 mJ/mg, ethylene content was 0.0%, and [r] was 98.0%.

Comparative Example 2

Production of 4-methyl-1-pentene Polymer

The experiment was performed in the same manner as in Example 1, except that through the glass blowing tube, a mixed gas of 10 NL/h of nitrogen and 100 NL/h of ethylene was flown and in the polymerization atmosphere, $P_E/P_O$ was 0.2340.

Comparative Example 3

Production of 4-methyl-1-pentene Polymer

The experiment was performed in the same manner as in Example 1, except that through the glass blowing tube, a mixed gas containing 150 NL/h of ethylene was flown and in the polymerization atmosphere, $P_E/P_O$ was 0.2808.

Example 5

Production of Propylene Polymer

Into a sufficiently nitrogen-purged 500 mL glass autoclave (equipped with a glass blowing tube), 400 mL of heptane was introduced and was kept at 50° C. On the other hand, into a sufficiently nitrogen-purged 30 mL side-arm flask, a magnetic stirrer was placed, and thereto, 2.62 mL (Al=4 mmol) of a hexane solution of methylaluminoxane (Al concentration: 1.52 mol/L) manufactured by Tosoh Finechem Corporation, and then 3.67 mg (0.004 mmol) of dibenzylmethylene(cyclopentadienyl)(2,7-di-p-chlorophenyl-3,6-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0 M) was added, and then the above solution was added to the autoclave. Through the glass blowing tube, a mixed gas of 150 NL/h of propylene and 1 NL/h of ethylene was flown to initiate polymerization. In the polymerization atmosphere, $P_E/P_O$ was calculated to be 0.0067. The mixed gas of propylene and ethylene was continuously fed during polymerization and under ordinary pressure at 50° C. for 15 minutes, polymerization was performed. Thereafter, a small amount of isobutylalcohol was added to terminate polymerization. The polymer solution was added to 1.5 L of methanol containing 1 mL of hydrochloric acid, to precipitate a propylene polymer. The propylene polymer obtained was vacuum dried at 80° C. for 10 hours: as a result, 3.76 g of the propylene polymer was obtained. The polymerization activity was 3.76 kg/mmol-Zr·hr. With regard to the propylene polymer: [η] was 1.57 dl/g, Tc was 102° C., Tm was 155° C., ΔH(Tm) was 51.6 mJ/mg, ethylene content was 0.5%, [r] was 98.0%.

Example 6

Production of Propylene Polymer

The experiment was performed in the same manner as in Example 5, except that through the glass blowing tube, a mixed gas of 150 NL/h of propylene and 0.8 NL/h of ethylene was flown to initiate polymerization and in the polymerization atmosphere, $P_E/P_O$ was 0.0053.

Example 7

Production of Propylene Polymer

The experiment was performed in the same manner as in Example 5, except that through the glass blowing tube, a mixed gas of 150 NL/h of propylene and 1.5 NL/h of ethylene was flown to initiate polymerization and in the polymerization atmosphere, $P_E/P_O$ was 0.0100.

Example 8

Production of Propylene Polymer

The experiment was performed in the same manner as in Example 5, except that through the glass blowing tube, a mixed gas of 150 NL/h of propylene and 4.0 NL/h of ethylene was flown to initiate polymerization and in the polymerization atmosphere, $P_E/P_O$ was 0.0267.

Comparative Example 4

Production of Propylene Polymer

The experiment was performed in the same manner as in Example 5, except that through the glass blowing tube, 150 NL/h of propylene alone was flown to initiate polymerization.

Comparative Example 5

Production of Propylene Polymer

The experiment was performed in the same manner as in Example 5, except that through the glass blowing tube, a mixed gas of 150 NL/h of propylene and 10.5 NL/h of ethylene was flown to initiate polymerization and in the polymerization atmosphere, $P_E/P_O$ was 0.0700.

Example 9

Production of Propylene Polymer

The experiment was performed in the same manner as in Example 5, except that the transition metal compound was (a4): dibenzylmethylene(cyclopentadienyl)(2,7-diphenyl-3,6-di-tert-butylfluorenyl)zirconiumdichloride, and through the glass blowing tube, a mixed gas of 150 NL/h of propylene and 0.3 NL/h of ethylene was flown to initiate polymerization and in the polymerization atmosphere, $P_E/P_O$ was 0.0020.

Example 10

Production of Propylene Polymer

The experiment was performed in the same manner as in Example 5, except that the transition metal compound was (a4) dibenzylmethylene(cyclopentadienyl)(2,7-diphenyl-3,6-di-tert-butylfluorenyl)zirconiumdichloride.

Comparative Example 6

Production of Propylene Polymer

The experiment was performed in the same manner as in Example 5, except that the transition metal compound was (a4): dibenzylmethylene(cyclopentadienyl)(2,7-diphenyl-3,6-di-tert-butylfluorenyl)zirconiumdichloride, and through the glass blowing tube, 150 NL/h of propylene alone was flown to initiate polymerization.

Example 11

Production of Propylene Polymer

The experiment was performed in the same manner as in Example 5, except that the transition metal compound was (a5): di-p-chlorobenzylmethylene(cyclopentadienyl)(2,7-diphenyl-3,6-di-tert-butylfluorenyl)zirconiumdichloride, and through the glass blowing tube, a mixed gas of 150 NL/h of propylene and 0.45 NL/h of ethylene was flown to initiate polymerization and in the polymerization atmosphere, $P_E/P_O$ was 0.0033.

Comparative Example 7

Production of Propylene Polymer

The experiment was performed in the same manner as in Example 5, except that the transition metal compound was (a5): di-p-chlorobenzylmethylene(cyclopentadienyl)(2,7-diphenyl-3,6-di-tert-butylfluorenyl)zirconiumdichloride, and through the glass blowing tube, 150 NL/h of propylene alone was flown to initiate polymerization.

Reference Example 1

Production of 4-methyl-1-pentene Polymer

Into a sufficiently nitrogen-purged 500 mL glass autoclave (equipped with a glass blowing tube), 200 mL of 4-methyl-1-pentene was introduced and was kept at 40° C. On the other hand, into a sufficiently nitrogen-purged 30 mL side-arm flask, a magnetic stirrer was placed, and thereto, 1.31 mL (Al=2 mmol) of a hexane solution of methylaluminoxane (Al concentration: 1.52 mol/L) manufactured by Tosoh Finechem Corporation, and then 2.96 mg (0.004 mmol) of diphenylmethylene(3-tert-butyl-5-methylcyclopentadienyl)(2,7-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0 M) was added, and then the above solution was added to the autoclave. Through the glass blowing tube, 25 NL/h of nitrogen was flown to initiate polymerization. Nitrogen was continuously fed during polymerization and under ordinary pressure at 40° C. for 30 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 1.82 g of the 4-methyl-1-pentene polymer was obtained. The polymerization activity was 0.91 kg/mmol-Zr·hr. With regard to the 4-methyl-1-pentene polymer obtained, the intrinsic viscosity [η] was 2.04 dl/g, Tc was 203° C., Tm was 232° C., ΔH(Tm) was 27.8 mJ/mg, ethylene content was 0.0%, and [r] was 2.0%.

Reference Example 2

Into a sufficiently nitrogen-purged 500 mL glass autoclave (equipped with a glass blowing tube), 200 mL of 4-methyl-1-pentene was introduced and was kept at 40° C. On the other hand, into a sufficiently nitrogen-purged 30 mL side-arm flask, a magnetic stirrer was placed, and thereto, 1.31 mL (Al=2 mmol) of a hexane solution of methylaluminoxane (Al concentration: 1.52 mol/L) manufactured by Tosoh Finechem Corporation, and then 2.96 mg (0.004 mmol) of diphenylmethylene(3-tert-butyl-5-methylcyclopentadienyl)(2,7-di-tert-butylfluorenyl)zirconiumdichloride and 2 mL of dehydrated toluene were added and were stirred for 10 minutes. Into the autoclave to which nitrogen had been flown, 1.0 mmol of a toluene solution of triisobutylaluminum (Al=1.0 M) was added, and then the above solution was added to the autoclave. Through the glass blowing tube, a mixed gas of 100 NL/h of nitrogen and 20 NL/h of ethylene was flown to initiate polymerization. In the polymerization atmosphere: $P_O$ was 1.5875 and $P_E$ was 0.1488, and thus $P_E/P_O$ was calculated to be 0.0937. The mixed gas of nitrogen and ethylene was continuously fed during polymerization and under ordinary pressure at 40° C. for 10 minutes, polymerization was performed. Thereafter, a small amount of isobutylalcohol was added to terminate polymerization. The polymer solution was added to 1.5 L of methanol containing 1 mL of hydrochloric acid, to precipitate a 4-methyl-1-pentene polymer. The polymer was vacuum dried at 80° C. for 10 hours: as a result, 1.03 g of the 4-methyl-1-pentene polymer was obtained. The polymerization activity was 1.55 kg/mmol-Zr·hr. With regard to the 4-methyl-1-pentene polymer obtained: [η] was 1.57 dl/g, Tc was 200° C., Tm was 228° C., ΔH(Tm) was 19.2 mJ/mg, ethylene content was 0.3%, and [r] was 2.0%.

Reference Example 3

The experiment was performed in the same manner as in Reference Example 2, except that through the glass blowing tube, a mixed gas of 25 NL/h of nitrogen and 0.5 NL/h of ethylene was flown to initiate polymerization and in the polymerization atmosphere, $P_E/P_O$ was 0.0023.

Reference Example 4

The experiment was performed in the same manner as in Reference Example 2, except that through the glass blowing tube, a mixed gas of 20 NL/h of nitrogen and 4 NL/h of ethylene was flown to initiate polymerization and in the polymerization atmosphere, $P_E/P_O$ was 0.0190.

The results of Examples 1 to 11, Comparative Examples 1 to 7 and Reference Examples 1 to 4 are set forth in Tables 1-1 to 1-5.

TABLE 1-1

| Run-No. | α-olefin | Transition metal compound | $P_E/P_O$ | Polymerization activity kg/mmol-Zr · hr | [η] dl/g | Tc ° C. | Tm ° C. | Ethylene content mol % | [r] % |
|---|---|---|---|---|---|---|---|---|---|
| Ex. 1 | 4-methyl-1-pentene | a1 | 0.0023 | 7.35 | 0.88 | 153 | 201 | 0.2 | 98.2 |
| Ex. 2 | 4-methyl-1-pentene | a1 | 0.0047 | 7.77 | 0.98 | 149 | 199 | 0.4 | 97.7 |
| Ex. 3 | 4-methyl-1-pentene | a1 | 0.0141 | 8.88 | 1.10 | 143 | 197 | 0.6 | 97.6 |
| Ex. 4 | 4-methyl-1-pentene | a1 | 0.0234 | 9.54 | 1.18 | 139 | 195 | 1.0 | 97.9 |
| Comp. Ex. 1 | 4-methyl-1-pentene | a1 | 0.0000 | 0.22 | 0.60 | 155 | 204 | 0.0 | 98.0 |
| Comp. Ex. 2 | 4-methyl-1-pentene | a1 | 0.2340 | 17.30 | 1.22 | 118 | 181 | 3.6 | 97.7 |
| Comp. Ex. 3 | 4-methyl-1-pentene | a1 | 0.2808 | 16.69 | 1.37 | 109 | 172 | 4.5 | 97.7 |

TABLE 1-2

| Run-No. | α-olefin | Transition metal compound | $P_E/P_O$ | Polymerization activity kg/mmol-Zr·hr | [η] dl/g | Tc °C. | Tm °C. | Ethylene content mol % | [r] % |
|---|---|---|---|---|---|---|---|---|---|
| Ex. 5 | propylene | a2 | 0.0067 | 3.76 | 1.57 | 102 | 155 | 0.5 | 98.0 |
| Ex. 6 | propylene | a2 | 0.0053 | 3.05 | 1.49 | 104 | 155 | 0.3 | 98.7 |
| Ex. 7 | propylene | a2 | 0.0100 | 3.50 | 1.50 | 103 | 154 | 0.5 | 98.0 |
| Ex. 8 | propylene | a2 | 0.0267 | 3.83 | 1.52 | 101 | 153 | 1.2 | 97.8 |
| Comp. Ex. 4 | propylene | a2 | 0.0000 | 1.60 | 1.40 | 102 | 156 | 0.0 | 98.0 |
| Comp. Ex. 5 | propylene | a2 | 0.0700 | 5.95 | 1.40 | 87 | 140 | 3.0 | 97.0 |

TABLE 1-3

| Run-No. | α-olefin | Transition metal compound | $P_E/P_O$ | Polymerization activity kg/mmol-Zr·hr | [η] dl/g | Tc °C. | Tm °C. | Ethylene content mol % | [r] % |
|---|---|---|---|---|---|---|---|---|---|
| Ex. 9 | propylene | a4 | 0.0020 | 5.80 | 1.73 | 101 | 154 | 0.5 | 98.0 |
| Ex. 10 | propylene | a4 | 0.0067 | 8.60 | 1.84 | 99 | 152 | 1.4 | 96.0 |
| Comp. Ex. 6 | propylene | a4 | 0.0000 | 2.69 | 1.72 | 103 | 154 | 0.0 | 98.0 |

TABLE 1-4

| Run-No. | α-olefin | Transition metal compound | $P_E/P_O$ | Polymerization activity kg/mmol-Zr·hr | [η] dl/g | Tc °C. | Tm °C. | Ethylene content mol % | [r] % |
|---|---|---|---|---|---|---|---|---|---|
| Ex. 11 | propylene | a5 | 0.0033 | 4.17 | 1.65 | 145 | 152 | 0.7 | 97.5 |
| Comp. Ex. 7 | propylene | a5 | 0.0000 | 2.03 | 1.55 | 145 | 156 | 0.0 | 98.0 |

TABLE 1-5

| Run-No. | α-olefin | Transition metal compound | $P_E/P_O$ | Polymerization activity Kg/mmol-Zr·hr | [η] dl/g | Tc °C. | Tm °C. | Ethylene content mol % | [r] % |
|---|---|---|---|---|---|---|---|---|---|
| Ref. Ex. 1 | 4-methyl-1-pentene | a3 | 0.0000 | 0.91 | 2.04 | 203 | 232 | 0.0 | 2.0 |
| Ref. Ex. 2 | 4-methyl-1-pentene | a3 | 0.0937 | 1.55 | 1.57 | 200 | 228 | 0.3 | 2.0 |
| Ref. Ex. 3 | 4-methyl-1-pentene | a3 | 0.0023 | 1.68 | 1.66 | 203 | 231 | 0.0 | 2.0 |
| Ref. Ex. 4 | 4-methyl-1-pentene | a3 | 0.0190 | 1.95 | 1.76 | 205 | 231 | 0.0 | 2.0 |

Transition Metal Compounds
(a1): dibenzylmethylene(cyclopentadienyl)(3,6-di-tert-butylfluorenyl)zirconiumdichloride
(a2): dibenzylmethylene(cyclopentadienyl)(2,7-di-p-chlorophenyl-3,6-di-tert-butylfluorenyl)zirconiumdichloride
(a3): diphenylmethylene(3-tert-butyl-5-methylcyclopentadienyl)(2,7-di-tert-butylfluorenyl)zirconiumdichloride
(a4): dibenzylmethylene(cyclopentadienyl)(2,7-diphenyl-3,6-di-tert-butylfluorenyl)zirconiumdichloride
(a5): di-p-chlorobenzylmethylene(cyclopentadienyl)(2,7-diphenyl-3,6-di-tert-butylfluorenyl)zirconiumdichloride

INDUSTRIAL APPLICABILITY

The production of syndiotactic α-olefin polymers having high molecular weight and high melting point with excellent polymerization activity under industrially-possible production conditions that is accomplished by the present invention brings great advantage to polyolefin industry. For example, when propylene and ethylene are used as a monomer, the resultant syndiotactic polypropylene, in spite of containing a trace amount of a unit derived from ethylene, has high racemic diad fraction and high molecular weight and maintains high melting point; furthermore, when α-olefins other than propylene are used, too, syndiotactic α-olefin polymers having high racemic diad fraction and high molecular weight and maintaining high melting point can be industrially produced. In this way, the present invention finds a wide range of applications and thus is useful.

The invention claimed is:

1. A process for producing a syndiotactic α-olefin polymer comprising polymerizing a monomer that comprises at least one α-olefin having 3 to 10 carbon atoms and a small amount of ethylene, in the presence of an olefin polymerization catalyst comprising a transition metal compound (A) represented by the following general formula [1], at least one compound (B) selected from an organoaluminum oxy-compound (b-1), a compound (b-2) that reacts with the transition metal compound (A) to form an ion pair and an organoaluminum compound (b-3),
which process for producing a syndiotactic α-olefin polymer satisfies the relationship: $0.001 \leq P_E/P_O \leq 0.030$, wherein $P_E$ and $P_O$ are molar amounts of ethylene and the α-olefin respectively that are fed to a polymerization reactor under a polymerization temperature of not lower than 25° C.;

[1]

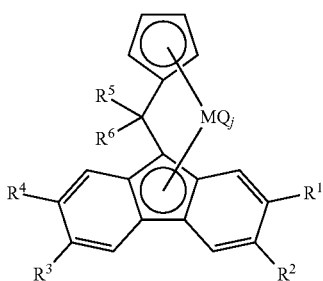

wherein four groups: $R^1$, $R^2$, $R^3$ and $R^4$ are selected from the group consisting of a hydrogen atom, a hydrocarbon group and a silicon-containing group, and are the same as or different from one another; $R^1$ and $R^2$ are not bonded to each other to form a ring; $R^3$ and $R^4$ are not bonded to each other to form a ring; $R^5$ and $R^6$ are each an atom or a substituent selected from the group consisting of a hydrogen atom, a hydrocarbon group having 2 to 20 carbon atoms and a silicon-containing group, and are the same as or different from one another; M is selected from a titanium atom, a zirconium atom and a hafnium atom; Q is a halogen atom, a hydrocarbon group, a neutral and conjugated or non-conjugated diene having 10 or less carbon atoms, an anionic ligand or a neutral ligand capable of coordination by lone pair electrons; j is an integer of 1 to 4, and when j is 2 or more, each Q is the same as or different from one another.

2. The process for producing a syndiotactic α-olefin polymer according to claim 1, wherein in the general formula [1], $R^2$ and $R^3$ are the same atom or the same group.

3. The process for producing a syndiotactic α-olefin polymer according to claim 1, wherein in the general formula [1], $R^2$ and $R^3$ are t-butyl groups.

4. The process for producing a syndiotactic α-olefin polymer according to claim 1, wherein in the general formula [1], $R^2$ and $R^3$ are t-butyl groups; and $R^1$ and $R^4$ are hydrogen atoms or aryl groups having 6 to 20 carbon atoms and are the same as or different from each other.

5. The process for producing a syndiotactic α-olefin polymer according to claim 1, wherein in the general formula [1], $R^5$ and $R^6$ are hydrocarbon groups having 6 to 20 carbon atoms and are the same as or different from each other.

6. The process for producing a syndiotactic α-olefin polymer according to claim 1, wherein in the general formula [1], $R^5$ and $R^6$ are aryl groups having 6 to 20 carbon atoms or aralkyl groups having 6 to 20 carbon atoms, and are the same as or different from each other.

7. The process for producing a syndiotactic α-olefin polymer according to claim 1, wherein in the general formula [1], $R^2$ and $R^3$ are t-butyl groups; $R^1$ and $R^4$ are hydrogen atoms or aryl groups having 6 to 20 carbon atoms and may be the same as or different from each other; and $R^5$ and $R^6$ are aryl groups having 6 to 20 carbon atoms or aralkyl groups having 6 to 20 carbon atoms, and are the same as or different from each other.

8. The process for producing a syndiotactic α-olefin polymer according to claim 7, wherein in the general formula [1], $R^5$ and $R^6$ are aralkyl groups having 6 to 20 carbon atoms.

9. The process for producing a syndiotactic α-olefin polymer according to claim 1, wherein the at least one α-olefin is propylene.

10. A process for producing a syndiotactic α-olefin polymer according to claim 1, which comprises feeding ethylene and/or propylene to a polymerization reactor continuously or intermittently and the production process satisfies the relationship: $0.001 \leq P_E/P_O \leq 0.030$, wherein $P_E$ and $P_O$ are molar amounts of ethylene and the α-olefin respectively.

11. The process for producing a syndiotactic α-olefin polymer according to claim 1, wherein the at least one α-olefin is 4-methyl-1-pentene.

12. The process for producing a syndiotactic α-olefin polymer according to claim 1, wherein the syndiotactic α-olefin polymer comprises a structural unit X derived from at least one α-olefin and a structural unit Y derived from ethylene, and satisfies all of the following requirements [1] to [4]:
[1] provided that the content of the structural unit X in the polymer is x (mol %) and the content of the structural unit Y in the polymer is y (mol %), $98.5 \leq x \leq 99.9$, $1.5 \geq y \geq 0.1$ and $x+y=100$;
[2] the racemic diad fraction ([r]) as measured by $^{13}$C-NMR is $90\% \leq [r] < 100\%$;
[3] the intrinsic viscosity ([η]) as measured at 135° C. in decalin is 0.70 dl/g or more; and
[4] the melting point (Tm) as determined by differential scanning calorimetry (DSC) is 145° C. or higher.

13. A process for producing a syndiotactic α-olefin polymer according to claim 1, which comprises feeding ethylene and/or propylene to a polymerization reactor continuously or intermittently and the production process satisfies the relationship: $0.001 \leq P_E/PO \leq 0.030$, wherein $P_E$ and $P_O$ are molar amounts of ethylene and the α-olefin respectively, wherein the at least one α-olefin is 4-methyl-1-pentene.

14. A process for producing a syndiotactic α-olefin polymer according to claim 1, which comprises feeding ethylene and/or propylene to a polymerization reactor continuously or intermittently and the production process satisfies the relationship: $0.001 \leq P_E/P_O \leq 0.030$, wherein $P_E$ and $P_O$ are molar amounts of ethylene and the α-olefin respectively, wherein the syndiotactic α-olefin polymer comprises a structural unit X derived from at least one α-olefin and a structural unit Y derived from ethylene, and satisfies all of the following requirements [1] to [4];
[1] provided that the content of the structural unit X in the polymer is x (mol %) and the content of the structural unit Y in the polymer is y (mol %), $98.5 \leq x \leq 99.9$, $1.5 \geq y \geq 0.1$ and $x+y=100$;
[2] the racemic diad fraction ([r]) as measured by $^{13}$C-NMR is $90\% \leq [r] < 100\%$;
[3] the intrinsic viscosity ([η]) as measured at 135° C. in decalin is 0.70 dl/g or more; and
[4] the melting point (Tm) as determined by differential scanning calorimetry (DSC) is 145° C. or higher.

* * * * *